(12) United States Patent
Ye et al.

(10) Patent No.: US 12,189,090 B2
(45) Date of Patent: Jan. 7, 2025

(54) OPTICAL IMAGING LENS ASSEMBLY

(71) Applicant: Zhejiang Sunny Optics Co., Ltd, Yuyao (CN)

(72) Inventors: Lihui Ye, Yuyao (CN); Huan Wang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 503 days.

(21) Appl. No.: 17/538,462

(22) Filed: Nov. 30, 2021

(65) Prior Publication Data

US 2022/0196985 A1 Jun. 23, 2022

(30) Foreign Application Priority Data

Dec. 21, 2020 (CN) .......................... 202011517805.5

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ....... G02B 13/0045; G02B 9/64; G02B 13/18
USPC ........................................................ 359/755
See application file for complete search history.

(56) References Cited

U.S. PATENT DOCUMENTS

| | | | |
|---|---|---|---|
| 2020/0249437 A1* | 8/2020 | Hirano | G02B 13/0045 |
| 2020/0285028 A1* | 9/2020 | Hirano | H04N 23/55 |
| 2022/0075143 A1 | 3/2022 | Tian | |
| 2022/0082800 A1* | 3/2022 | Zhu | G02B 9/64 |
| 2022/0260811 A1* | 8/2022 | Chen | G02B 9/64 |

FOREIGN PATENT DOCUMENTS

CN 209707794 U 11/2019

* cited by examiner

*Primary Examiner* — Stephone B Allen
(74) *Attorney, Agent, or Firm* — Barnes & Thornburg LLP

(57) ABSTRACT

An optical imaging lens assembly is provided. The optical imaging lens assembly includes, sequentially along an optical axis from an object side to an image side: a first lens, having a refractive power; a second lens, having a positive refractive power; a third lens, having a refractive power; a fourth lens, having a refractive power; a fifth lens, having a refractive power; a sixth lens, having a refractive power; a seventh lens, having a refractive power; an eighth lens, having a negative refractive power, an object-side surface of the eighth lens being a concave surface; and a ninth lens, having a refractive power. Here, an effective focal length f of the optical imaging lens assembly and an entrance pupil diameter EPD of the optical imaging lens assembly satisfy: f/EPD<1.9.

19 Claims, 7 Drawing Sheets

OPTICAL IMAGING LENS ASSEMBLY

CROSS-REFERENCE TO RELATED APPLICATION

This application claims benefit of priority to Chinese Patent Application No. 202011517805.5 filed on Dec. 21, 2020 before the China National Intellectual Property Administration, the entire disclosure of which is incorporated herein by reference in its entity.

TECHNICAL FIELD

The present disclosure belongs to the field of optical imaging, and specifically relates to an optical imaging lens assembly including nine lenses.

BACKGROUND

In recent years, with the improvement of performance and the reduction of a pixel size of a photosensitive element (e.g., a charge-coupled device (CCD) or a complementary metal-oxide semiconductor element (CMOS)) applied to a portable electronic product such as a mobile phone, users propose higher requirements on the imaging quality, the size, etc. of the camera lens group of the portable electronic product such as a smart phone. A lens assembly of a main camera, as one of key members of combined lens assemblies of multiple cameras, has high pixels and is responsible for shooting the overall picture, and thus becomes one of the important objects continuously studied and upgraded by major manufacturers of the portable electronic product such as the smart phone.

A camera lens group including multiple lenses provides more possibilities to the improvement of the imaging performance of the portable electronic product such as the smart phone, because of providing more design freedom. At the same time, with the advancement of processing and manufacturing technology, it would be possible that a camera lens group of a certain size has a greater number of lenses.

SUMMARY

In an aspect of the present disclosure, an optical imaging lens is provided, and the optical imaging lens includes, sequentially along an optical axis from an object side to an image side: a first lens having a refractive power; a second lens, having a positive refractive power; a third lens, having a refractive power; a fourth lens, having a refractive power; a fifth lens, having a refractive power; a sixth lens, having a refractive power; a seventh lens, having a refractive power; an eighth lens, having a negative refractive power, an object-side surface of the eighth lens being a concave surface; and a ninth lens, having a refractive power.

An effective focal length f of the optical imaging lens assembly and an entrance pupil diameter EPD of the optical imaging lens assembly satisfy: $f/EPD<1.9$.

According to an embodiment of the present disclosure, an effective focal length f2 of the second lens and an effective focal length f1 of the first lens satisfy: $0.5<f2/f1<1.5$.

According to an embodiment of the present disclosure, an effective focal length f5 of the fifth lens, an effective focal length f3 of the third lens, an effective focal length f9 of the ninth lens and an effective focal length f8 of the eighth lens satisfy: $0.6<f5/f3+f9/f8<1.6$.

According to an embodiment of the present disclosure, a radius of curvature R8 of an image-side surface of the fourth lens, a radius of curvature R7 of an object-side surface of the fourth lens and an effective focal length f4 of the fourth lens satisfy: $0<(R8-R7)/f4<1.0$.

According to an embodiment of the present disclosure, a radius of curvature R13 of an object-side surface of the seventh lens and an effective focal length f7 of the seventh lens satisfy: $0<R13/f7<1.0$.

According to an embodiment of the present disclosure, a combined focal length f56 of the fifth lens and the sixth lens and a combined focal length f789 of the seventh lens, the eighth lens and the ninth lens satisfy: $-2.0<f56/f789<-0.5$.

According to an embodiment of the present disclosure, a half of a diagonal length ImgH of an effective pixel area on an image plane, a maximal effective radius DT81 of the object-side surface of the eighth lens and a maximal effective radius DT82 of an image-side surface of the eighth lens satisfy: $0.5<ImgH/(DT81+DT82)<1.0$.

According to an embodiment of the present disclosure, an axial distance SAG41 from an intersection point of the object-side surface of the fourth lens and the optical axis to a vertex of an effective radius of the object-side surface of the fourth lens and an axial distance SAG51 from an intersection point of an object-side surface of the fifth lens and the optical axis to a vertex of an effective radius of the object-side surface of the fifth lens satisfies: $0.5<SAG41/SAG51<1$.

According to an embodiment of the present disclosure, an axial distance SAG62 from an intersection point of an image-side surface of the sixth lens and the optical axis to a vertex of an effective radius of the image-side surface of the sixth lens and an axial distance SAG91 from an intersection point of an object-side surface of the ninth lens and the optical axis to a vertex of an effective radius of the object-side surface of the ninth lens satisfy: $0.5<SAG62/SAG91<1.0$.

According to an embodiment of the present disclosure, a center thickness CT8 of the eighth lens on the optical axis and an axial distance SAG82 from an intersection point of the image-side surface of the eighth lens and the optical axis to a vertex of an effective radius of the image-side surface of the eighth lens satisfy: $-1.0<CT8/SAG82<-0.5$.

According to an embodiment of the present disclosure, a radius of curvature R3 of an object-side surface of the second lens, a radius of curvature R1 of an object-side surface of the first lens and a radius of curvature R2 of an image-side surface of the first lens satisfy: $0<R3/(R1+R2)<1.0$.

According to an embodiment of the present disclosure, a radius of curvature R5 of an object-side surface of the third lens, a radius of curvature R6 of an image-side surface of the third lens, and a radius of curvature R10 of an image-side surface of the fifth lens satisfy: $0<(R5+R6)/R10<1.0$.

According to an embodiment of the present disclosure, a radius of curvature R11 of an object-side surface of the sixth lens and a radius of curvature R12 of the image-side surface of the sixth lens satisfy: $0.3<R11/(R11+R12)<1.3$.

According to an embodiment of the present disclosure, a radius of curvature R15 of the object-side surface of the eighth lens, a radius of curvature R16 of the image-side surface of the eighth lens, a radius of curvature R17 of the object-side surface of the ninth lens and a radius of curvature R14 of an image-side surface of the seventh lens satisfy: $1.0<R15/R16+R17/R14<2.0$.

According to an embodiment of the present disclosure, an axial air spacing T34 between the third lens and the fourth lens, an axial air spacing T45 between the fourth lens and the fifth lens, an axial spacing distance T56 between the fifth lens and the sixth lens and a center thickness CT6 of the sixth lens on the optical axis satisfy: 0.3<(T34+T45+T56)/CT6<0.8.

According to an embodiment of the present disclosure, a center thickness CT9 of the ninth lens on the optical axis, a center thickness CT7 of the seventh lens on the optical axis, an axial air spacing T89 between the eighth lens and the ninth lens and an axial spacing distance T78 between the seventh lens and the eighth lens satisfy: 0.7<CT9/CT7+T89/T78<1.2.

According to an embodiment of the present disclosure, the fourth lens has a positive refractive power, the object-side surface of the fourth lens is a concave surface, and the image-side surface of the fourth lens is a convex surface. The fifth lens has a negative refractive power, and an image-side surface of the fifth lens is a concave surface. The object-side surface of the seventh lens is a convex surface. the image-side surface of the eighth lens is a convex surface.

In another aspect of the present disclosure, an optical imaging lens is provided, and the optical imaging lens includes sequentially along an optical axis from an object side to an image side: a first lens, having a refractive power; a second lens, having a positive refractive power; a third lens, having a refractive power; a fourth lens, having a refractive power; a fifth lens, having a negative refractive power; a sixth lens, having a refractive power; a seventh lens, having a refractive power; an eighth lens, having a refractive power, an object-side surface of the eighth lens being a concave surface; and a ninth lens, having a refractive power.

Each lens is independent of each other, and each lens has an air gap on the optical axis; the effective focal length f of the optical imaging lens and the entrance pupil diameter EPD of the optical imaging lens satisfy: f/EPD<1.9.

BRIEF DESCRIPTION OF THE DRAWINGS

In order to explain the technical solution in the embodiments of the present disclosure more clearly, the accompanying drawings used in the description for the embodiments will be briefly introduced below. Clearly, the accompanying drawings in the following description are only some embodiments of the present disclosure. It is also possible for those of ordinary skill in the art to obtain other drawings according to these drawings, without any creative efforts.

DETAILED DESCRIPTION OF EMBODIMENTS

Figure 1:
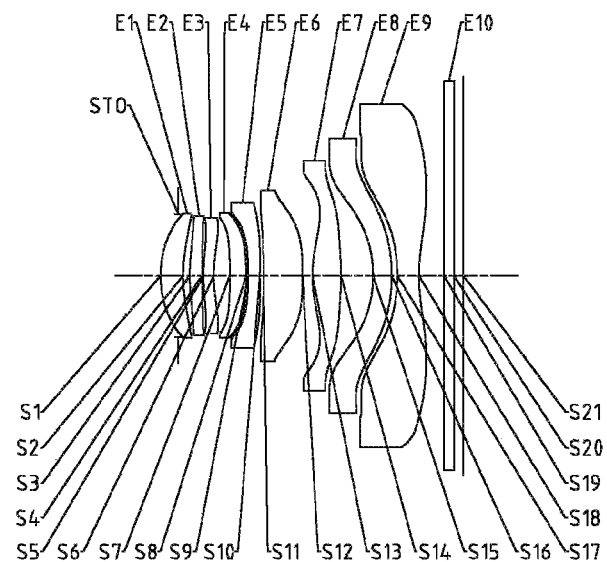
FIG. 1 is a schematic structural diagram of a lens group in Embodiment 1 of an optical imaging lens assembly according to the present disclosure.

The technical solution in the embodiments of the present disclosure will be clearly and completely described below in combination with the accompanying drawings in the embodiments of the present disclosure. Clearly, the described embodiments are only some of the embodiments of the present disclosure, rather than all of the embodiments. Based on the embodiments in the present disclosure, all other embodiments obtained by those of ordinary skill in the art without creative efforts shall fall within the scope of protection of the present disclosure.

It should be noted that, in the specification, the expressions such as "first," "second," and "third" are only used to distinguish one feature from another, rather than represent any limitations to the features. Thus, the first lens discussed below may also be referred to as the second lens or the third lens without departing from the teachings of the present disclosure.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In the description for the present disclosure, a paraxial area refers to an area near an optical axis. If a lens surface is a convex surface and the position of the convex surface is not defined, it represents that at least a paraxial area of the lens surface is a convex surface. If the lens surface is a concave surface and the position of the concave surface is not defined, it represents that at least a paraxial area of the lens surface is a concave surface. A surface of each lens that is closest to a photographed object is referred to as the object-side surface of the lens, and a surface of the each lens that is closest to an image plane is referred to as the image-side surface of the lens.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. Features, principles, and other aspects of the present disclosure will be described below in detail with reference to the accompanying drawings and in combination with the embodiments.

Exemplary Implementations

An optical imaging lens assembly according to exemplary implementations of the present disclosure includes nine lenses, the optical imaging lens assembly including, sequentially along an optical axis from an object side to an image side, a first lens, a second lens, a third lens, a fourth lens, a fifth lens, a sixth lens, a seventh lens, an eighth lens and a ninth lens. Here, the lenses are independent of each other, and have an air spacing on the optical axis.

In the exemplary implementations, the first lens may have a positive refractive power or a negative refractive power. The second lens has a positive refractive power. The third lens may have a positive refractive power or a negative refractive power. The fourth lens may have a positive refractive power or a negative refractive power. The fifth lens may have a positive refractive power or a negative refractive power. The sixth lens may have a positive refractive power or a negative refractive power. The seventh lens may have a positive refractive power or a negative refractive power. The eighth lens has a negative refractive power, and an object-side surface of the eighth lens is a concave surface. The ninth lens may have a positive refractive power or a negative refractive power. By reasonably controlling the refractive powers of the second lens and the eighth lens, the spherical aberration caused by the lenses of the system can be within a reasonable range, such that a good imaging quality is obtained in the axial field.

In the exemplary implementations, the conditional expression satisfied by an effective focal length f of the optical imaging lens assembly f and an entrance pupil diameter EPD of the optical imaging lens assembly is f/EPD<1.9. Through the configuration that the effective focal length f of the optical imaging lens assembly and the entrance pupil diameter EPD of the optical imaging lens assembly satisfy f/EPD<1.9, the system can have the advantages of large diaphragm and large aperture in the process of increasing the amount of admitted light, thereby enhancing the imaging effect in a dark environment while reducing the aberration of the edge field, and thus, the system has a low sensitivity. More specifically, f and EPD satisfy: $1.85 < f/EPD < 1.88$.

In the exemplary implementations, the conditional expression satisfied by an effective focal length f2 of the second lens and an effective focal length f1 of the first lens is: $0.5 < f2/f1 < 1.5$. By controlling the effective focal lengths of the first lens and the second lens, the focal lengths of the lenses can be reasonably distributed, and at the same time, the field curvature can also be balanced. More specifically, f2 and f1 satisfy: $0.88 < f2/f1 < 1.08$.

In the exemplary implementations, the conditional expression satisfied by an effective focal length f5 of the fifth lens, an effective focal length f3 of the third lens, an effective focal length f9 of the ninth lens and an effective focal length f8 of the eighth lens is: $0.6 < f5/f3 + f9/f8 < 1.6$. By controlling the effective focal lengths of the third lens, the fifth lens, the eighth lens and the ninth lens, the field curvature of the system is effectively controlled, thereby improving the image quality of the system. More specifically, f5, f3, f9 and f8 satisfy: $0.66 < f5/f3 + f9/f8 < 1.58$.

In the exemplary implementations, the conditional expression satisfied by a radius of curvature R8 of an image-side surface of the fourth lens, a radius of curvature R7 of an object-side surface of the fourth lens and an effective focal length f4 of the fourth lens is: $0 < (R8-R7)/f4 < 1.0$. The effective focal length f4 of the fourth lens and the radii of curvature R7 and R8 of the object-side surface and image-side surface of the fourth lens are controlled to satisfy $0 < (R8-R7)/f4 < 1.0$, which is conductive to improving the spherical aberration and astigmatism of the system. More specifically, R8, R7 and f4 satisfy: $0.20 < (R8-R7)/f4 < 0.55$.

In the exemplary implementations, the conditional expression satisfied by a radius of curvature R13 of an object-side surface of the seventh lens and an effective focal length f7 of the seventh lens is: $0 < R13/f7 < 1.0$. By controlling the radius of curvature R13 of the object-side surface of the seventh lens and the effective focal length f7 of the seventh lens, the optical imaging system can have a good capability of balancing the astigmatism. More specifically, R13 and f7 satisfy: $0.65 < R13/f7 < 0.84$.

In the exemplary implementations, the conditional expression satisfied by a combined focal length f56 of the fifth lens and the sixth lens and a combined focal length f789 of the seventh lens, the eighth lens and the ninth lens is: $-2.0 < f56/f789 < -0.5$. By reasonably configuring the refractive power of the system, the distortion of a paraxial area of an image plane can be effectively corrected, thereby improving the imaging quality of the system. More specifically, f56 and f789 satisfy: $-1.34 < f56/f789 < -0.58$.

In the exemplary implementations, the conditional expression satisfied by a half of a diagonal length ImgH of an effective pixel area on the image plane, a maximal effective radius DT81 of the object-side surface of the eighth lens and a maximal effective radius DT82 of an image-side surface of the eighth lens is: $0.5 < ImgH/(DT81+DT82) < 1.0$. Through configuring the half of the diagonal length of the effective pixel area on the image plane and the maximal effective radii of the object-side surface and image-side surface of the eighth lens, the overall size of an imaging system can be effectively compressed to achieve the miniaturization of the imaging system. More specifically, ImgH, DT81 and DT82 satisfy: $0.77 < ImgH/(DT81+DT82) < 0.82$.

In the exemplary implementations, the conditional expression satisfied by an axial distance SAG41 from an intersection point of the object-side surface of the fourth lens and the optical axis to a vertex of an effective radius of the object-side surface of the fourth lens and an axial distance SAG51 from an intersection point of an object-side surface of the fifth lens and the optical axis to a vertex of an effective radius of the object-side surface of the fifth lens is: $0.5<SAG41/SAG51<1$. The axial distance SAG41 from the intersection point of the object-side surface of the fourth lens and the optical axis to the vertex of the effective radius of the object-side surface of the fourth lens and the axial distance SAG51 from the intersection point of the object-side surface of the fifth lens and the optical axis to the vertex of the effective radius of the object-side surface of the fifth lens are controlled to satisfy $0.5<SAG41/SAG51<1$, which is conductive to the uniform size distribution of the lenses and to reducing the difficulty in processing and assembling the lenses. More specifically, SAG41 and SAG51 satisfy: $0.57<SAG41/SAG51<0.73$.

In the exemplary implementations, the conditional expression satisfied by an axial distance SAG62 from an intersection point of an image-side surface of the sixth lens and the optical axis to a vertex of an effective radius of the image-side surface of the sixth lens and an axial distance SAG91 from an intersection point of an object-side surface of the ninth lens and the optical axis to a vertex of an effective radius of the object-side surface of the ninth lens is: $0.5<SAG62/SAG91<1.0$. The axial distance SAG62 from the intersection point of the image-side surface of the sixth lens and the optical axis to the vertex of the effective radius of the image-side surface of the sixth lens and the axial distance SAG91 from the intersection point of the object-side surface of the ninth lens and the optical axis to the vertex of the effective radius of the object-side surface of the ninth lens are reasonably controlled, which is conductive to the uniform size distribution of the lenses to ensure the assembly stability, and to the reduction of the aberration of the entire imaging system. More specifically, SAG62 and SAG91 satisfy: $0.69<SAG62/SAG91<0.94$.

In the exemplary implementations, the conditional expression satisfied by a center thickness CT8 of the eighth lens on the optical axis and an axial distance SAG82 from an intersection point of the image-side surface of the eighth lens and the optical axis to a vertex of an effective radius of the image-side surface of the eighth lens is: $-1.0<CT8/SAG82<-0.5$. The center thickness CT8 of the eighth lens on the optical axis and the axial distance SAG82 from the intersection point of the image-side surface of the eighth lens and the optical axis to the vertex of the effective radius of the image-side surface of the eighth lens are controlled to satisfy $-1.0<CT8/SAG82<-0.5$. The lens configured in this way has a large refractive power with respect to the off-axis field, which is conductive to shortening the overall length of the lens assembly, and also to improving the resolution of the system. More specifically, CT8 and SAG82 satisfy: $-0.71<CT8/SAG82<-0.53$.

In the exemplary implementations, the conditional expression satisfied by a radius of curvature R3 of an object-side surface of the second lens, a radius of curvature R1 of an object-side surface of the first lens and a radius of curvature R2 of an image-side surface of the first lens is: $0<R3/(R1+R2)<1.0$. By controlling the radii of curvature of the first lens and curvature of the second lens to satisfy $0<R3/(R1+R2)<1.0$, the optical imaging system can have a larger diaphragm, thereby improving the overall brightness of a formed image. More specifically, R3, R1 and R2 satisfy: $0.77<R3/(R1+R2)<0.93$.

In the exemplary implementations, the conditional expression satisfied by a radius of curvature R5 of an object-side surface of the third lens, a radius of curvature R6 of an image-side surface of the third lens, and a radius of curvature R10 of an image-side surface of the fifth lens is: $0<(R5+R6)/R10<1.0$. By controlling the radii of curvature of the third lens and curvature of the fifth lens to satisfy $0<(R5+R6)/R10<1.0$, the optical imaging system can have a larger diaphragm, thereby improving the overall brightness of a formed image. More specifically, R5, R6 and R10 satisfy: $0.36<(R5+R6)/R10<0.85$.

In the exemplary implementations, the conditional expression satisfied by a radius of curvature R11 of an object-side surface of the sixth lens and a radius of curvature R12 of the image-side surface of the sixth lens is: $0.3<R11/(R11+R12)<1.3$. By reasonably setting the radii of curvature of the sixth lens, the deflection angle of the light is easily controlled, such that the system can easily match the commonly used chip. More specifically, R11 and R12 satisfy: $0.44<R11/(R11+R12)<1.12$.

In the exemplary implementations, the conditional expression satisfied by a radius of curvature R15 of the object-side surface of the eighth lens, a radius of curvature R16 of the image-side surface of the eighth lens, a radius of curvature R17 of the object-side surface of the ninth lens and a radius of curvature R14 of an image-side surface of the seventh lens is: $1.0<R15/R16+R17/R14<2.0$. By reasonably configuring the radii of curvatures of the seventh lens, the eighth lens and the ninth lens, the spherical aberration of the optical lens assembly can be effectively eliminated, thereby obtaining a high definition image. More specifically, R15, R16, R17 and R14 satisfy: $1.30<R15/R16+R17/R14<1.56$.

In the exemplary implementations, the conditional expression satisfied by an axial air spacing T34 between the third lens and the fourth lens, an axial air spacing T45 between the fourth lens and the fifth lens, an axial spacing distance T56 between the fifth lens and the sixth lens and a center thickness CT6 of the sixth lens on the optical axis is: $0.3<(T34+T45+T56)/CT6<0.8$. The air spacings between the third lens, the fourth lens, the fifth lens and the sixth lens on the optical axis and the center thickness of the sixth lens on the optical axis are reasonably controlled, which is conductive to the uniform size distribution of the lenses to ensure the assembly stability, and to the reduction of the aberration of the entire optical imaging lens assembly. More specifically, T34, T45, T56 and CT6 satisfy: $0.54<(T34+T45+T56)/CT6<0.61$.

In the exemplary implementations, the conditional expression satisfied by a center thickness CT9 of the ninth lens on the optical axis, a center thickness CT7 of the seventh lens on the optical axis, an axial air spacing T89 between the eighth lens and the ninth lens and an axial spacing distance T78 between the seventh lens and the eighth lens is: $0.7<CT9/CT7+T89/T78<1.2$. By reasonably controlling the axial air spacing between the seventh lens and the ninth lens and the center thicknesses of the seventh lens and the ninth lens on the optical axis, the requirements for the machinability and process of the lens assembly can be met while the compactness of the structure of the optical lens assembly is ensured. More specifically, CT9, CT7, T89 and T78 satisfy: $0.93<CT9/CT7+T89/T78<1.11$.

In the exemplary implementations, the fourth lens has a positive refractive power, the object-side surface of the fourth lens is a concave surface, and the image-side surface of the fourth lens is a convex surface. The fifth lens has a negative refractive power, and an image-side surface of the fifth lens is a concave surface. The object-side surface of the seventh lens is a convex surface. The image-side surface of the eighth lens is a convex surface. The object-side surface of the ninth lens is a concave surface. By reasonably controlling the distribution of the positive and negative refractive powers of the components of the system and the amount of the admitted light, the low-order aberration of the system is effectively balanced and controlled. At the same time, by controlling the full field of view, the imaging range of the system is effectively controlled.

In the exemplary implementations, the above optical imaging lens assembly may further include a diaphragm. The diaphragm may be disposed at an appropriate position as needed, for example, the diaphragm may be disposed between the object side and the first lens. Alternatively, the above optical imaging lens assembly may further include an optical filter for correcting color deviations and/or a protective glass for protecting a photosensitive element on the image plane.

The optical imaging lens assembly according to the above implementations of the present disclosure may use a plurality of lenses, for example, the nine lenses described above. By reasonably distributing the refractive powers and the surface types of the lenses, the center thicknesses of the lenses, the axial spacings between the lenses, etc., the optical imaging lens assembly has a large image plane, has the characteristics of a wide imaging range and a high imaging quality, and ensures the ultra-thinness of a mobile phone.

In the exemplary implementations, at least one of the surfaces of the lenses is an aspheric surface. That is, at least one of the surfaces from the object-side surface of the first lens to the image-side surface of the ninth lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one surface in the object-side surfaces and the image-side surfaces of the first lens, the second lens, the third lens, the fourth lens, the fifth lens, the sixth lens, the seventh lens, the eighth lens and the ninth lens is an aspheric surface. Alternatively, the object-side surface and the image-side surface of each of the first lens, the second lens, the third lens, the fourth lens, the fifth lens, the sixth lens, the seventh lens, the eighth lens and the ninth lens are aspheric surfaces.

However, it should be understood by those skilled in the art that the various results and advantages described in the present specification may be obtained by changing the number of the lenses constituting the optical imaging lens assembly without departing from the technical solution claimed by the invention. For example, although the optical imaging lens assembly having nine lenses is described as an example in the implementations, the optical imaging lens assembly is not limited to the nine lenses. If desired, the optical imaging lens assembly may also include other numbers of lenses.

Specific embodiments of the optical imaging lens assembly applicable to the above embodiments are further described below with reference to the accompanying drawings.

Embodiment 1

FIG. 1 is a schematic structural diagram of a lens group in Embodiment 1 of an optical imaging lens assembly according to the present disclosure. The optical imaging lens assembly includes, sequentially along an optical axis from an object side to an image side, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an image plane S21.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The ninth lens E9 has a negative refractive power, an object-side surface S17 of the ninth lens E9 is a concave surface, and an image-side surface S18 of the ninth lens E9 is a concave surface. The optical filter E10 has an object-side surface S19 and an image-side surface S20. Light from an object sequentially passes through the surfaces S1-S20 and finally forms an image on the image plane S21.

As shown in Table 1, Table 1 is a table showing basic parameters of the optical imaging lens assembly in Embodiment 1. Here, the units of a radius of curvature, a thickness and a focal length are millimeters (mm).

TABLE 1

| surface number | surface type | radius of curvature | thickness/ distance | focal length | refractive index | abbe number | conic coefficient |
| --- | --- | --- | --- | --- | --- | --- | --- |
| OBJ | spherical | infinite | infinite | | | | |
| STO | spherical | infinite | −0.3838 | | | | |
| S1 | aspheric | 2.2029 | 0.4861 | 10.75 | 1.55 | 56.1 | 0.1597 |
| S2 | aspheric | 3.2517 | 0.1406 | | | | −0.2320 |
| S3 | aspheric | 4.2034 | 0.2617 | 10.67 | 1.55 | 56.1 | −2.3575 |
| S4 | aspheric | 14.7512 | 0.0347 | | | | −13.9199 |
| S5 | aspheric | 4.2907 | 0.2200 | −18.65 | 1.67 | 20.4 | −3.1995 |

TABLE 1-continued

| surface number | surface type | radius of curvature | thickness/ distance | focal length | refractive index | abbe number | conic coefficient |
|---|---|---|---|---|---|---|---|
| S6 | aspheric | 3.1241 | 0.3444 | | | | −1.3457 |
| S7 | aspheric | −14.2465 | 0.3507 | 15.93 | 1.55 | 56.1 | 96.1057 |
| S8 | aspheric | −5.4461 | 0.0410 | | | | 2.2851 |
| S9 | aspheric | −10.5006 | 0.2500 | −9.49 | 1.67 | 20.4 | 17.0550 |
| S10 | aspheric | 16.0605 | 0.0813 | | | | −30.8791 |
| S11 | aspheric | −47.9656 | 0.8367 | 32.30 | 1.57 | 38.0 | −99.0000 |
| S12 | aspheric | −13.3946 | 0.2137 | | | | 27.9606 |
| S13 | aspheric | 2.7986 | 0.6117 | 3.65 | 1.54 | 55.9 | −5.7546 |
| S14 | aspheric | −6.0217 | 0.6898 | | | | −26.3703 |
| S15 | aspheric | −2.7778 | 0.4000 | −22.38 | 1.64 | 23.8 | −0.9773 |
| S16 | aspheric | −3.6393 | 0.1191 | | | | −1.1542 |
| S17 | aspheric | −3.6386 | 0.6839 | −3.44 | 1.54 | 55.9 | −1.0335 |
| S18 | aspheric | 3.9239 | 0.3219 | | | | −1.6868 |
| S19 | spherical | infinite | 0.2100 | | 1.52 | 64.2 | |
| S20 | spherical | infinite | 0.2031 | | | | |
| S21 | spherical | infinite | | | | | |

As shown in Table 2, in Embodiment 1, the total effective focal length of the optical imaging lens assembly is f=4.84 mm, and the axial distance from the object-side surface S1 of first lens E1 to the image plane S21 is TTL=6.50 mm. The half of the diagonal length of the effective pixel area on the image plane S21 is ImgH=4.25 mm. The half of the maximal field-of-view of an optical imaging system is Semi-FOV=43.0°.

TABLE 2

| Embodiment 1 | | | |
|---|---|---|---|
| f(mm) | 4.84 | TTL(mm) | 6.50 |
| ImgH(mm) | 4.25 | Semi-FOV(°) | 43.0 |
| f/EPD | 1.88 | f2/f1 | 0.99 |
| f5/f3 + f9/f8 | 0.66 | (R8 − R7)/f4 | 0.55 |
| R13/f7 | 0.77 | f56/f789 | −0.58 |
| ImgH/(DT81 + DT82) | 0.77 | SAG41/SAG51 | 0.60 |
| SAG62/SAG91 | 0.74 | CT8/SAG82 | −0.53 |
| R3/(R1 + R2) | 0.77 | (R5 + R6)/R10 | 0.46 |
| R11/(R11 + R12) | 0.78 | R15/R16 + R17/R14 | 1.37 |
| (T34 + T45 + T56)/CT6 | 0.56 | CT9/CT7 + T89/T78 | 0.93 |

The optical imaging lens assembly in Embodiment 1 satisfies:
f/EPD=1.88, f being the effective focal length of the optical imaging lens assembly and EPD being the entrance pupil diameter of the optical imaging lens assembly;
f2/f1=0.99, f2 being the effective focal length of the second lens, and f1 being the effective focal length of the first lens;
f5/f3+f9/f8=0.66, f5 being the effective focal length of the fifth lens, f3 being the effective focal length of the third lens, f9 being the effective focal length of the ninth lens, and f8 being the effective focal length of the eighth lens;
(R8−R7)/f4=0.55, R8 being the radius of curvature of the image-side surface of the fourth lens, R7 being the radius of curvature of the object-side surface of the fourth lens, and f4 being the effective focal length of the fourth lens;
R13/f7=0.77, R13 being the radius of curvature of the object-side surface of the seventh lens, and f7 being the effective focal length of the seventh lens;
f56/f789=−0.58, f56 being the combined focal length of the fifth lens and the sixth lens, and f789 being the combined focal length of the seventh lens, the eighth lens and the ninth lens;

ImgH/(DT81+DT82)=0.77, ImgH being the half of the diagonal length of the effective pixel area on the image plane, DT81 being the maximal effective radius of the object-side surface of the eighth lens, and DT82 being the maximal effective radius of the image-side surface of the eighth lens;
SAG41/SAG51=0.60, SAG41 being the axial distance from the intersection point of the object-side surface of the fourth lens and the optical axis to the vertex of the effective radius of the object-side surface of the fourth lens, and SAG51 being the axial distance from the intersection point of the object-side surface of the fifth lens and the optical axis to the vertex of the effective radius of the object-side surface of the fifth lens;
SAG62/SAG91=0.74, SAG62 being the axial distance from the intersection point of the image-side surface of the sixth lens and the optical axis to the vertex of the effective radius of the image-side surface of the sixth lens, and SAG91 being the axial distance from the intersection point of the object-side surface of the ninth lens and the optical axis to the vertex of the effective radius of the object-side surface of the ninth lens;
CT8/SAG82=−0.53, CT8 being the center thickness of the eighth lens on the optical axis, and SAG82 being the axial distance from the intersection point of the image-side surface of the eighth lens and the optical axis to the vertex of the effective radius of the image-side surface of the eighth lens;
R3/(R1+R2)=0.77, R3 being the radius of curvature of the object-side surface of the second lens, R1 being the radius of curvature of the object-side surface of the first lens, and R2 being the radius of curvature of the image-side surface of the first lens;
(R5+R6)/R10=0.46, R5 being the radius of curvature of the object-side surface of the third lens, R6 being the radius of curvature of the image-side surface of the third lens, and R10 being the radius of curvature of the image-side surface of the fifth lens;
R11/(R11+R12)=0.78, R11 being the radius of curvature of the object-side surface of the sixth lens, and R12 being the radius of curvature of the image-side surface of the sixth lens;
R15/R16+R17/R14=1.37, R15 being the radius of curvature of the object-side surface of the eighth lens, R16 being the radius of curvature of the image-side surface of the eighth lens, R17 being the radius of curvature of the object-side surface of the ninth lens, and R14 being the radius of curvature of the image-side surface of the seventh lens;

(T34+T45+T56)/CT6=0.56, T34 being the axial air spacing between the third lens and the fourth lens, T45 being the axial air spacing between the fourth lens and the fifth lens, T56 being the axial spacing distance between the fifth lens and the sixth lens, and CT6 being the center thickness of the sixth lens on the optical axis; and CT9/CT7+T89/T78=0.93, CT9 being the center thickness of the ninth lens on the optical axis, CT7 being the center thickness of the seventh lens on the optical axis, T89 being the axial air spacing between the eighth lens and the ninth lens, and T78 being the axial spacing distance between the seventh lens and the eighth lens.

In Embodiment 1, the object-side surface and the image-side surface of each lens in the first to ninth lenses E1-E9 are both aspheric surfaces, and the surface type x of each aspheric lens may be defined using, but not limited to, the following formula:

$$x = \frac{ch^2}{1 + \sqrt{1 - (k+1)c^2h^2}} + \Sigma A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1); k is the conic coefficient; and Ai is the correction coefficient of an i-th order of the aspheric surface.

In Embodiment 1, the object-side surface and the image-side surface of each lens in the first to ninth lenses E1-E9 are both aspheric surfaces. Table 3 shows the high-order coefficients $A_4, A_6, A_8, A_{10}, A_{12}, A_{14}, A_{16}, A_{18}, A_{20}, A_{22}, A_{24}$ and $A_{26}$ applicable to the aspheric surfaces S1-S18 in Embodiment 1.

TABLE 3

| surface number | A4 | A6 | A8 | A10 | A12 | A14 |
|---|---|---|---|---|---|---|
| S1 | 1.5621E−02 | 6.4113E−03 | 1.4051E−03 | 3.4126E−04 | 7.8394E−05 | 2.8082E−05 |
| S2 | −8.7499E−02 | 4.6198E−03 | 2.4697E−03 | 2.1324E−04 | 2.0368E−04 | 1.0720E−04 |
| S3 | −9.9512E−02 | 9.4351E−03 | 5.1377E−03 | 5.6320E−05 | 4.7158E−04 | 2.3886E−04 |
| S4 | −2.2486E−02 | 5.2783E−03 | 2.4762E−03 | −1.3759E−04 | 7.9861E−04 | 9.1723E−05 |
| S5 | −1.3426E−01 | −2.3081E−03 | −1.2854E−03 | −1.8103E−04 | 4.2668E−04 | −1.2404E−04 |
| S6 | −1.4993E−01 | −3.1516E−03 | −7.1355E−04 | 1.0543E−04 | 1.4518E−04 | −3.8211E−05 |
| S7 | −1.1529E−01 | −1.9114E−02 | 1.2378E−03 | 1.6617E−04 | 1.5727E−04 | 8.2549E−05 |
| S8 | −1.6430E−01 | −1.8607E−02 | 3.1624E−03 | −1.8153E−03 | 6.4111E−05 | 4.5563E−04 |
| S9 | −2.4182E−01 | 1.0563E−03 | −3.3211E−03 | −1.5809E−03 | 2.9361E−04 | 5.1107E−04 |
| S10 | −2.1753E−01 | 3.2494E−02 | −7.4913E−03 | −3.7217E−04 | 8.1461E−04 | 1.3288E−04 |
| S11 | −5.7629E−02 | 3.1178E−02 | −1.8477E−03 | −1.9788E−03 | 1.0210E−03 | −1.6935E−04 |
| S12 | −5.5437E−01 | 1.0451E−01 | 8.7004E−03 | 5.0675E−03 | 5.1972E−05 | −9.6926E−04 |
| S13 | −7.7268E−01 | −1.7454E−03 | 2.1984E−02 | 6.9357E−03 | 4.5433E−03 | −4.7851E−04 |
| S14 | −7.9688E−02 | 8.4670E−03 | 4.9030E−02 | −2.7255E−02 | 7.0403E−03 | 2.4564E−03 |
| S15 | 8.6774E−02 | 2.5856E−01 | −4.5250E−02 | −1.7470E−02 | 4.5592E−03 | 5.3323E−03 |
| S16 | 2.3294E−01 | 2.0928E−01 | −4.7108E−02 | −1.1321E−02 | −8.8889E−04 | 2.8552E−03 |
| S17 | 3.1769E−01 | 2.4566E−01 | −1.0429E−01 | −1.0282E−02 | 1.4216E−02 | −1.2574E−03 |
| S18 | −2.0336E+00 | 3.3058E−01 | −1.2559E−01 | 7.8269E−03 | −1.5063E−02 | −3.5566E−03 |

| surface number | A16 | A18 | A20 | A22 | A24 | A26 |
|---|---|---|---|---|---|---|
| S1 | 5.1342E−06 | 0.0000E+00 | 0.0000E+00 | 0.0000E+00 | 0.0000E+00 | 0.0000E+00 |
| S2 | 2.2388E−05 | 0.0000E+00 | 0.0000E+00 | 0.0000E+00 | 0.0000E+00 | 0.0000E+00 |
| S3 | 5.4293E−06 | 0.0000E+00 | 0.0000E+00 | 0.0000E+00 | 0.0000E+00 | 0.0000E+00 |
| S4 | −1.5365E−05 | 0.0000E+00 | 0.0000E+00 | 0.0000E+00 | 0.0000E+00 | 0.0000E+00 |
| S5 | −5.9827E−05 | 0.0000E+00 | 0.0000E+00 | 0.0000E+00 | 0.0000E+00 | 0.0000E+00 |
| S6 | −2.2246E−05 | 0.0000E+00 | 0.0000E+00 | 0.0000E+00 | 0.0000E+00 | 0.0000E+00 |
| S7 | 1.2244E−05 | 0.0000E+00 | 0.0000E+00 | 0.0000E+00 | 0.0000E+00 | 0.0000E+00 |
| S8 | 1.6046E−04 | 0.0000E+00 | 0.0000E+00 | 0.0000E+00 | 0.0000E+00 | 0.0000E+00 |
| S9 | 1.8320E−04 | 0.0000E+00 | 0.0000E+00 | 0.0000E+00 | 0.0000E+00 | 0.0000E+00 |
| S10 | 2.8045E−05 | 0.0000E+00 | 0.0000E+00 | 0.0000E+00 | 0.0000E+00 | 0.0000E+00 |
| S11 | −8.1918E−05 | 0.0000E+00 | 0.0000E+00 | 0.0000E+00 | 0.0000E+00 | 0.0000E+00 |
| S12 | −4.8250E−04 | −1.8583E−04 | 0.0000E+00 | 0.0000E+00 | 0.0000E+00 | 0.0000E+00 |
| S13 | −1.5756E−03 | −5.2523E−04 | 0.0000E+00 | 0.0000E+00 | 0.0000E+00 | 0.0000E+00 |
| S14 | −7.4005E−04 | 0.0000E+00 | 0.0000E+00 | 0.0000E+00 | 0.0000E+00 | 0.0000E+00 |
| S15 | −1.9327E−03 | −3.0962E−04 | 1.5297E−04 | −2.0173E−04 | −1.5756E−04 | 3.4468E−05 |
| S16 | −2.0839E−03 | −1.1067E−03 | 4.6807E−04 | 9.9139E−05 | −1.2561E−04 | −7.7025E−05 |
| S17 | 2.5288E−04 | −2.9839E−03 | 1.3518E−03 | −6.4322E−04 | −5.5321E−04 | −1.7870E−04 |
| S18 | 3.1660E−03 | 5.1970E−04 | 2.0259E−03 | 0.0000E+00 | 0.0000E+00 | 0.0000E+00 |

Figure 2A:
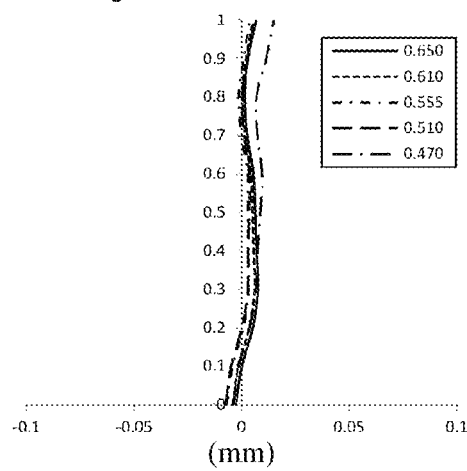
FIGS. 2a-2d respectively show a longitudinal aberration curve, an astigmatic curve, a distortion curve and a lateral color curve of Embodiment 1 of the optical imaging lens assembly according to the present disclosure.
Figure 2B:
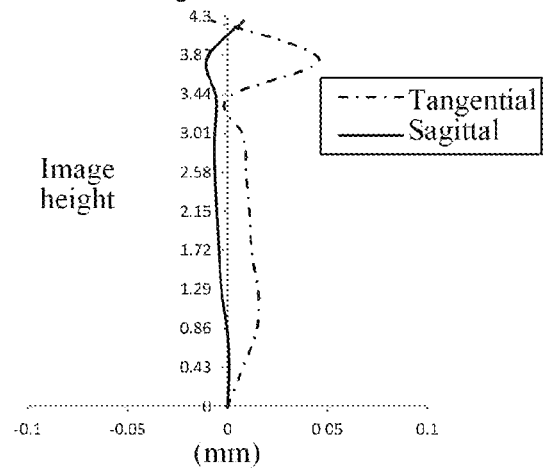
Figure 2C:
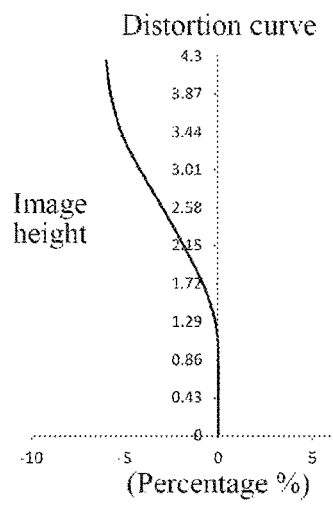
Figure 2D:
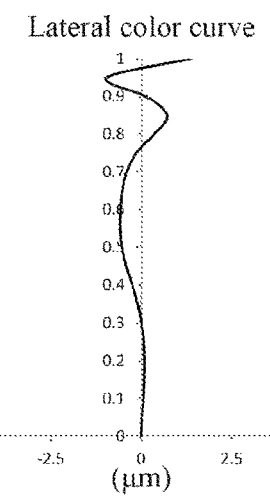

FIG. 2a illustrates a longitudinal aberration curve of the optical imaging lens assembly according to Embodiment 1, representing deviations of focal points at which lights of different wavelengths converge after passing through the lens assembly. FIG. 2b illustrates an astigmatic curve of the optical imaging lens assembly according to Embodiment 1, representing a curvature of a tangential image plane and a curvature of a sagittal image plane. FIG. 2c illustrates a distortion curve of the optical imaging lens assembly according to Embodiment 1, representing amounts of distortion corresponding to different image heights. FIG. 2d illustrates a lateral color curve of the optical imaging lens assembly according to Embodiment 1, representing deviations of different heights of images on the image plane formed by lights passing through the lens assembly. It can be seen from FIGS. 2a-2d that the optical imaging lens assembly given in Embodiment 1 can achieve a good imaging quality.

Embodiment 2

Figure 3:
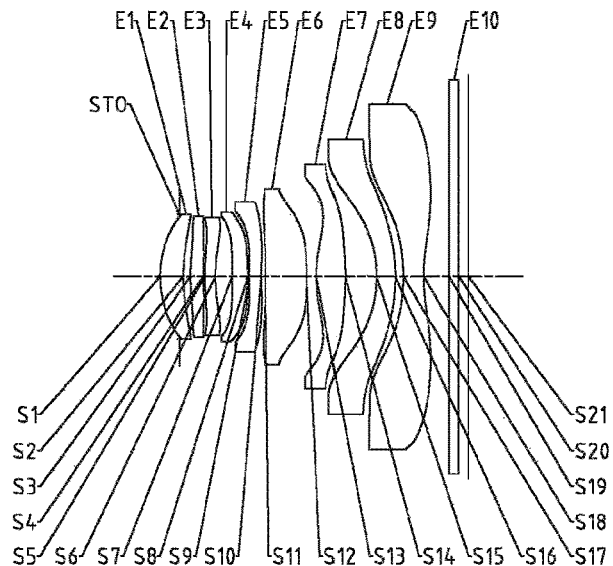
FIG. 3 is a schematic structural diagram of a lens group in Embodiment 2 of the optical imaging lens assembly according to the present disclosure.

FIG. 3 is a schematic structural diagram of a lens group in Embodiment 2 of the optical imaging lens assembly according to the present disclosure. The optical imaging lens assembly includes, sequentially along an optical axis from an object side to an image side, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an image plane S21.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The ninth lens E9 has a negative refractive power, an object-side surface S17 of the ninth lens E9 is a concave surface, and an image-side surface S18 of the ninth lens E9 is a concave surface. The optical filter E10 has an object-side surface S19 and an image-side surface S20. Light from an object sequentially passes through the surfaces S1-S20 and finally forms an image on the image plane S21.

As shown in Table 4, Table 4 is a table showing basic parameters of the optical imaging lens assembly in Embodiment 2. Here, the units of a radius of curvature, a thickness and a focal length are millimeters (mm).

TABLE 4

| surface number | surface type | radius of curvature | thickness/ distance | focal length | refractive index | abbe number | conic coefficient |
|---|---|---|---|---|---|---|---|
| OBJ | spherical | infinite | infinite | | | | |
| STO | spherical | infinite | −0.4067 | | | | |
| S1 | aspheric | 2.2636 | 0.4896 | 10.62 | 1.55 | 56.1 | 0.1392 |
| S2 | aspheric | 3.4291 | 0.1533 | | | | −0.2947 |
| S3 | aspheric | 4.8524 | 0.2791 | 9.82 | 1.55 | 56.1 | −3.5588 |
| S4 | aspheric | 50.0000 | 0.0307 | | | | 6.0985 |
| S5 | aspheric | 4.7625 | 0.2200 | −13.67 | 1.67 | 20.4 | −4.2651 |
| S6 | aspheric | 3.0696 | 0.3557 | | | | −1.3214 |
| S7 | aspheric | −14.6263 | 0.3310 | 26.79 | 1.55 | 56.1 | 87.0706 |
| S8 | aspheric | −7.3718 | 0.0352 | | | | 3.7660 |
| S9 | aspheric | −198.3768 | 0.2500 | −13.59 | 1.67 | 20.4 | −99.0000 |
| S10 | aspheric | 9.4925 | 0.0826 | | | | −61.5371 |
| S11 | aspheric | 180.4717 | 0.8711 | 29.64 | 1.57 | 38.0 | −99.0000 |
| S12 | aspheric | −18.6193 | 0.2079 | | | | 55.0979 |
| S13 | aspheric | 2.7566 | 0.6006 | 3.59 | 1.54 | 55.9 | −6.3567 |
| S14 | aspheric | −5.9095 | 0.6612 | | | | −12.2519 |
| S15 | aspheric | −2.8766 | 0.4000 | −15.44 | 1.64 | 23.8 | −0.8401 |
| S16 | aspheric | −4.2771 | 0.1672 | | | | −1.5550 |
| S17 | aspheric | −4.2540 | 0.4269 | −3.55 | 1.54 | 55.9 | −0.9358 |
| S18 | aspheric | 3.5658 | 0.5447 | | | | −1.8884 |
| S19 | spherical | infinite | 0.2100 | | 1.52 | 64.2 | |
| S20 | spherical | infinite | 0.1994 | | | | |
| S21 | spherical | infinite | | | | | |

As shown in Table 5, in Embodiment 2, the total effective focal length of the optical imaging lens assembly is f=4.84 mm, and the axial distance from the object-side surface S1 of first lens E1 to the image plane S21 is TTL=6.52 mm. The half of the diagonal length of the effective pixel area on the image plane S21 is ImgH=4.25 mm. The half of the maximal field-of-view of an optical imaging system is Semi-FOV=43.1°. The parameter in each relational expression is as explained in Embodiment 1, and the value of the each relational expression is listed in the following table.

TABLE 5

| Embodiment 2 | | | |
|---|---|---|---|
| f(mm) | 4.84 | TTL(mm) | 6.52 |
| ImgH(mm) | 4.25 | Semi-FOV(°) | 43.1 |
| f/EPD | 1.88 | f2/f1 | 0.92 |
| f5/f3 + f9/f8 | 1.22 | (R8 − R7)/f4 | 0.27 |
| R13/f7 | 0.77 | f56/f789 | −1.03 |
| ImgH/(DT81 + DT82) | 0.80 | SAG41/SAG51 | 0.72 |
| SAG62/SAG91 | 0.80 | CT8/SAG82 | −0.58 |
| R3/(R1 + R2) | 0.85 | (R5 + R6)/R10 | 0.83 |
| R11/(R11 + R12) | 1.12 | R15/R16 + R17/R14 | 1.39 |
| (T34 + T45 + T56)/CT6 | 0.54 | CT9/CT7 + T89/T78 | 0.96 |

In Embodiment 2, the object-side surface and the image-side surface of each lens in the first to ninth lenses E1-E9 are both aspheric surfaces. Table 6 shows the high-order coefficients $A_4, A_6, A_8, A_{10}, A_{12}, A_{14}, A_{16}, A_{18}, A_{20}, A_{22}, A_{24}$ and $A_{26}$ applicable to the aspheric surfaces S1-S18 in Embodiment 2.

TABLE 6

| surface number | A4 | A6 | A8 | A10 | A12 | A14 |
|---|---|---|---|---|---|---|
| S1 | 1.3084E−02 | 4.0923E−03 | 4.3266E−04 | −6.1331E−05 | −6.4790E−05 | −2.2467E−05 |
| S2 | −8.7429E−02 | 3.0667E−03 | 2.0667E−03 | 7.7099E−05 | 1.5615E−04 | 9.4580E−05 |
| S3 | −1.0551E−01 | 1.3427E−02 | 5.5492E−03 | 9.6328E−05 | 5.0603E−04 | 2.6486E−04 |
| S4 | −3.3264E−02 | 6.6922E−03 | 1.5153E−03 | −3.0021E−04 | 5.3100E−04 | 1.0630E−04 |
| S5 | −1.4087E−01 | −4.7885E−03 | −2.3284E−03 | −4.0315E−05 | 1.7962E−04 | −7.2400E−05 |
| S6 | −1.5033E−01 | −2.3495E−03 | −6.0839E−04 | 3.9298E−04 | 4.3151E−05 | −2.9778E−05 |
| S7 | −1.2083E−01 | −2.0177E−02 | 1.6427E−03 | 7.4939E−05 | −1.7799E−04 | −1.0049E−04 |
| S8 | −1.8834E−01 | −1.5537E−02 | 4.6273E−03 | −2.5251E−03 | −4.1939E−04 | 1.4821E−04 |
| S9 | −2.7573E−01 | 4.3178E−03 | −3.5780E−03 | −2.1376E−03 | 3.1148E−04 | 4.1702E−04 |
| S10 | −2.4545E−01 | 2.9769E−02 | −9.1766E−03 | −5.9760E−04 | 9.4088E−04 | 5.2601E−05 |
| S11 | −6.2976E−02 | 4.1635E−02 | −2.6222E−03 | −1.5023E−03 | 1.1233E−03 | −3.3024E−04 |
| S12 | −5.9829E−01 | 1.1641E−01 | 1.0577E−02 | 6.8568E−03 | 2.9734E−04 | −9.7787E−04 |
| S13 | −7.8841E−01 | −6.1146E−03 | 2.4483E−02 | 6.4841E−03 | 4.5132E−03 | 1.6946E−05 |
| S14 | −9.0962E−02 | 7.4362E−03 | 5.3457E−02 | −2.3328E−02 | 3.6579E−03 | 1.7015E−03 |
| S15 | −8.8814E−02 | 1.8354E−01 | −1.6418E−02 | −7.3125E−03 | −2.7006E−03 | 4.4935E−03 |
| S16 | 1.4227E−01 | 1.2743E−01 | −2.4614E−02 | −6.0445E−03 | −3.2516E−03 | 5.8182E−03 |
| S17 | 2.6401E−01 | 2.3822E−01 | −1.0373E−01 | −1.7027E−03 | 1.0340E−02 | −3.7900E−04 |
| S18 | −2.1344E+00 | 3.7120E−01 | −1.4275E−01 | 2.2522E−02 | −1.7787E−02 | −2.5557E−03 |

| surface number | A16 | A18 | A20 | A22 | A24 | A26 |
|---|---|---|---|---|---|---|
| S1 | −9.0913E−06 | 0.0000E+00 | 0.0000E+00 | 0.0000E+00 | 0.0000E+00 | 0.0000E+00 |
| S2 | 2.7061E−05 | 0.0000E+00 | 0.0000E+00 | 0.0000E+00 | 0.0000E+00 | 0.0000E+00 |
| S3 | 2.8802E−05 | 0.0000E+00 | 0.0000E+00 | 0.0000E+00 | 0.0000E+00 | 0.0000E+00 |
| S4 | −8.7078E−06 | 0.0000E+00 | 0.0000E+00 | 0.0000E+00 | 0.0000E+00 | 0.0000E+00 |
| S5 | −4.2936E−05 | 0.0000E+00 | 0.0000E+00 | 0.0000E+00 | 0.0000E+00 | 0.0000E+00 |
| S6 | −1.9286E−05 | 0.0000E+00 | 0.0000E+00 | 0.0000E+00 | 0.0000E+00 | 0.0000E+00 |
| S7 | −3.3092E−05 | 0.0000E+00 | 0.0000E+00 | 0.0000E+00 | 0.0000E+00 | 0.0000E+00 |
| S8 | 1.3707E−04 | 0.0000E+00 | 0.0000E+00 | 0.0000E+00 | 0.0000E+00 | 0.0000E+00 |
| S9 | 1.9555E−04 | 0.0000E+00 | 0.0000E+00 | 0.0000E+00 | 0.0000E+00 | 0.0000E+00 |
| S10 | 3.5815E−05 | 0.0000E+00 | 0.0000E+00 | 0.0000E+00 | 0.0000E+00 | 0.0000E+00 |
| S11 | −5.2018E−05 | 0.0000E+00 | 0.0000E+00 | 0.0000E+00 | 0.0000E+00 | 0.0000E+00 |
| S12 | −4.6303E−04 | −1.8106E−04 | 0.0000E+00 | 0.0000E+00 | 0.0000E+00 | 0.0000E+00 |
| S13 | −1.1492E−03 | −5.0434E−04 | 0.0000E+00 | 0.0000E+00 | 0.0000E+00 | 0.0000E+00 |
| S14 | −2.0966E−04 | 0.0000E+00 | 0.0000E+00 | 0.0000E+00 | 0.0000E+00 | 0.0000E+00 |
| S15 | −5.9966E−04 | −4.1173E−04 | 3.9402E−04 | 2.3910E−04 | −8.9718E−05 | −8.2888E−05 |
| S16 | −2.4487E−03 | −9.6119E−04 | 1.8016E−04 | 1.4551E−04 | −1.9375E−07 | −3.2147E−05 |
| S17 | 3.5144E−04 | −2.1348E−03 | 1.1415E−03 | −1.4800E−04 | −2.9956E−04 | −1.2236E−04 |
| S18 | 1.9095E−03 | 9.6915E−04 | 1.3409E−03 | 0.0000E+00 | 0.0000E+00 | 0.0000E+00 |

Figure 4A:
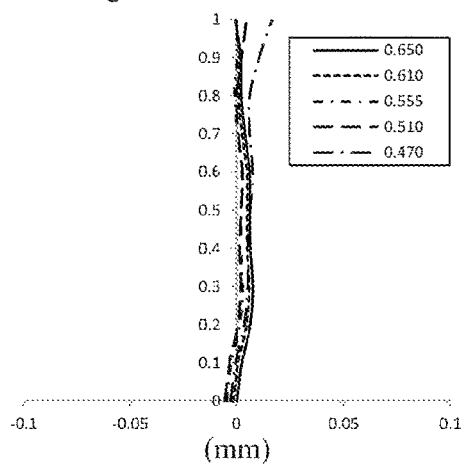
FIGS. 4a-4d respectively show a longitudinal aberration curve, an astigmatic curve, a distortion curve and a lateral color curve of Embodiment 2 of the optical imaging lens assembly according to the present disclosure.
Figure 4B:
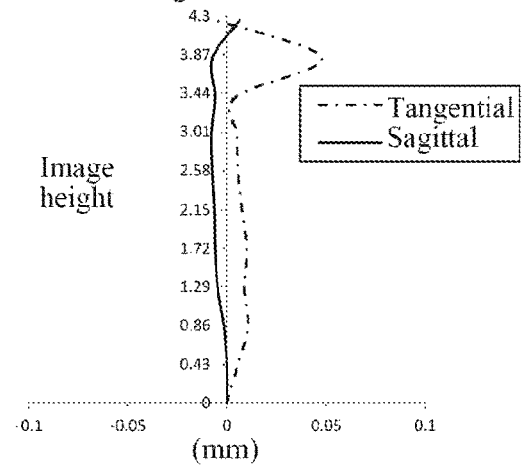
Figure 4C:
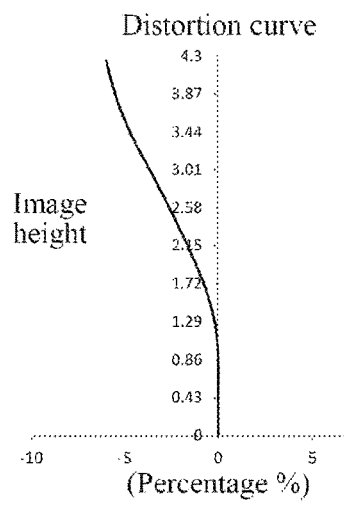
Figure 4D:
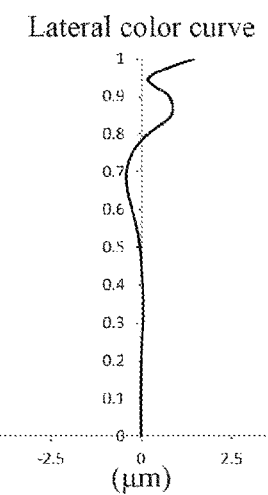

FIG. 4a illustrates a longitudinal aberration curve of the optical imaging lens assembly according to Embodiment 2, representing deviations of focal points at which lights of different wavelengths converge after passing through the lens assembly. FIG. 4b illustrates an astigmatic curve of the optical imaging lens assembly according to Embodiment 2, representing a curvature of a tangential image plane and a curvature of a sagittal image plane. FIG. 4c illustrates a distortion curve of the optical imaging lens assembly according to Embodiment 2, representing amounts of distortion corresponding to different image heights. FIG. 4d illustrates a lateral color curve of the optical imaging lens assembly according to Embodiment 2, representing deviations of different heights of images on the image plane formed by lights passing through the lens assembly. It can be seen from FIGS. 4a-4d that the optical imaging lens assembly given in Embodiment 2 can achieve a good imaging quality.

Embodiment 3

Figure 5:
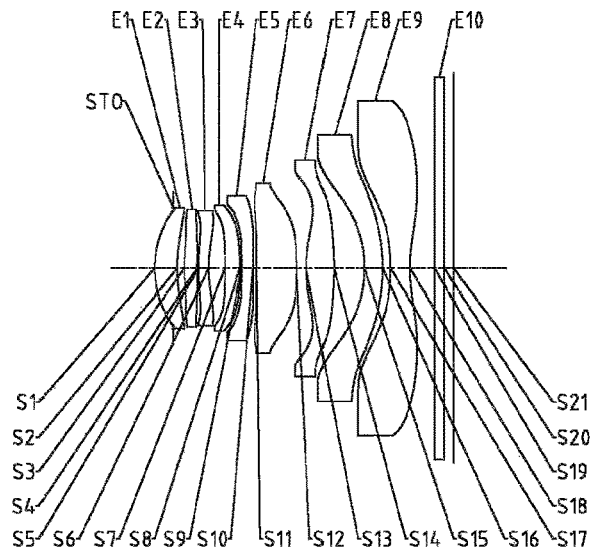
FIG. 5 is a schematic structural diagram of a lens group in Embodiment 3 of the optical imaging lens assembly according to the present disclosure.

FIG. 5 is a schematic structural diagram of a lens group in Embodiment 3 of the optical imaging lens assembly according to the present disclosure. The optical imaging lens assembly includes, sequentially along an optical axis from an object side to an image side, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an image plane S21.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The ninth lens E9 has a negative refractive power, an object-side surface S17 of the ninth lens E9 is a concave surface, and an image-side surface S18 of the ninth lens E9 is a concave surface. The optical filter E10 has an object-side surface S19 and an image-side surface S20. Light from an object sequentially passes through the surfaces S1-S20 and finally forms an image on the image plane S21.

As shown in Table 7, Table 7 is a table showing basic parameters of the optical imaging lens assembly in Embodiment 3. Here, the units of a radius of curvature, a thickness and a focal length are millimeters (mm).

TABLE 7

| surface number | surface type | radius of curvature | thickness/ distance | focal length | refractive index | abbe number | conic coefficient |
|---|---|---|---|---|---|---|---|
| OBJ | spherical | infinite | infinite | | | | |
| STO | spherical | infinite | −0.4058 | | | | |
| S1 | aspheric | 2.2657 | 0.4918 | 10.30 | 1.55 | 56.1 | 0.1389 |
| S2 | aspheric | 3.5027 | 0.1577 | | | | −0.2298 |
| S3 | aspheric | 5.1459 | 0.2792 | 9.93 | 1.55 | 56.1 | −3.6751 |
| S4 | aspheric | 100.0000 | 0.0297 | | | | −99.0000 |
| S5 | aspheric | 4.8827 | 0.2200 | −13.17 | 1.67 | 20.4 | −4.4976 |
| S6 | aspheric | 3.0805 | 0.3534 | | | | −1.3534 |
| S7 | aspheric | −14.4291 | 0.3276 | 29.22 | 1.55 | 56.1 | 81.6097 |
| S8 | aspheric | −7.6369 | 0.0350 | | | | 3.1985 |
| S9 | aspheric | 263.5973 | 0.2500 | −14.59 | 1.67 | 20.4 | −99.0000 |
| S10 | aspheric | 9.3755 | 0.0837 | | | | −61.8963 |
| S11 | aspheric | 272.8071 | 0.8655 | 31.21 | 1.57 | 38.0 | −99.0000 |
| S12 | aspheric | −19.0199 | 0.2101 | | | | 57.6242 |
| S13 | aspheric | 2.7272 | 0.5993 | 3.60 | 1.54 | 55.9 | −6.4667 |
| S14 | aspheric | −6.1062 | 0.6627 | | | | −10.4243 |
| S15 | aspheric | −2.9021 | 0.4000 | −15.27 | 1.64 | 23.8 | −0.8119 |
| S16 | aspheric | −4.3489 | 0.1731 | | | | −1.6702 |
| S17 | aspheric | −4.3293 | 0.4204 | −3.56 | 1.54 | 55.9 | −0.9319 |
| S18 | aspheric | 3.5392 | 0.5434 | | | | −1.9392 |
| S19 | spherical | infinite | 0.2100 | | 1.52 | 64.2 | |
| S20 | spherical | infinite | 0.1987 | | | | |
| S21 | spherical | infinite | | | | | |

As shown in Table 8, in Embodiment 3, the total effective focal length of the optical imaging lens assembly is f=4.84 mm, and the axial distance from the object-side surface S1 of first lens E1 to the image plane S21 is TTL=6.51 mm. The half of the diagonal length of the effective pixel area on the image plane S21 is ImgH=4.25 m. The half of the maximal field-of-view of an optical imaging system is Semi-FOV=43.1°. The parameter in each relational expression is as explained in Embodiment 1, and the value of the each relational expression is listed in the following table.

TABLE 8

| Embodiment 3 | | | |
|---|---|---|---|
| f(mm) | 4.84 | TTL(mm) | 6.51 |
| ImgH(mm) | 4.25 | Semi-FOV(°) | 43.1 |

TABLE 8-continued

| Embodiment 3 | | | |
|---|---|---|---|
| f/EPD | 1.88 | f2/f1 | 0.96 |
| f5/f3 + f9/f8 | 1.34 | (R8 − R7)/f4 | 0.23 |
| R13/f7 | 0.76 | f56/f789 | −1.13 |
| ImgH/(DT81 + DT82) | 0.80 | SAG41/SAG51 | 0.73 |
| SAG62/SAG91 | 0.81 | CT8/SAG82 | −0.59 |
| R3/(R1 + R2) | 0.89 | (R5 + R6)/R10 | 0.85 |
| R11/(R11 + R12) | 1.07 | R15/R16 + R17/R14 | 1.38 |
| (T34 + T45 + T56)/CT6 | 0.55 | CT9/CT7 + T89/T78 | 0.96 |

In Embodiment 3, the object-side surface and the image-side surface of each lens in the first to ninth lenses E1-E9 are both aspheric surfaces. Table 9 shows the high-order coefficients $A_4, A_6, A_8, A_{10}, A_{12}, A_{14}, A_{16}, A_{18}, A_{20}, A_{22}, A_{24}$ and $A_{26}$ applicable to the aspheric surfaces S1-S18 in Embodiment 3.

TABLE 9

| surface number | A4 | A6 | A8 | A10 | A12 | A14 |
|---|---|---|---|---|---|---|
| S1 | 1.2741E−02 | 3.8889E−03 | 3.7169E−04 | −8.0346E−05 | −7.1224E−05 | −2.4492E−05 |
| S2 | −8.7016E−02 | 3.3285E−03 | 2.0006E−03 | 8.6605E−05 | 1.7452E−04 | 1.0049E−04 |
| S3 | −1.0747E−01 | 1.5600E−02 | 5.8299E−03 | 2.8078E−04 | 6.5657E−04 | 2.9774E−04 |
| S4 | −3.3268E−02 | 6.3998E−03 | 1.6379E−03 | −3.2012E−04 | 6.0453E−04 | 9.3107E−05 |
| S5 | −1.4431E−01 | −5.8450E−03 | −2.1422E−03 | −8.5640E−05 | 1.9940E−04 | −9.3335E−05 |
| S6 | −1.5447E−01 | −2.3251E−03 | −4.8410E−04 | 3.8401E−04 | 1.9248E−05 | −4.2520E−05 |
| S7 | −1.2134E−01 | −2.0357E−02 | 1.6852E−03 | −3.7368E−05 | −2.4822E−04 | −1.2689E−04 |
| S8 | −1.9192E−01 | −1.5042E−02 | 4.3544E−03 | −2.7899E−03 | −4.2791E−04 | 1.7615E−04 |
| S9 | −2.8372E−01 | 4.5453E−03 | −4.0741E−03 | −2.2747E−03 | 3.9952E−04 | 4.7495E−04 |
| S10 | −2.5087E−01 | 2.9158E−02 | −9.4107E−03 | −6.7423E−04 | 9.8881E−04 | 6.2891E−05 |
| S11 | −6.4680E−02 | 4.1308E−02 | −2.5360E−03 | −1.4784E−03 | 1.1259E−03 | −3.2073E−04 |
| S12 | −5.9760E−01 | 1.1457E−01 | 9.8095E−03 | 7.0041E−03 | 4.3222E−04 | −8.5308E−04 |
| S13 | −7.8919E−01 | −5.6184E−03 | 2.4758E−02 | 6.5456E−03 | 4.3916E−05 | 5.4519E−05 |
| S14 | −9.5774E−02 | 6.6401E−03 | 5.3480E−02 | −2.2847E−02 | 3.3923E−03 | 1.6432E−03 |
| S15 | −1.0651E−01 | 1.7447E−01 | −1.4060E−02 | −6.0453E−03 | −3.1854E−03 | 4.0486E−03 |
| S16 | 1.2853E−01 | 1.1611E−01 | −1.9117E−02 | −5.0894E−03 | −3.8628E−03 | 5.4733E−03 |
| S17 | 2.5989E−01 | 2.3687E−01 | −1.0323E−01 | −4.6481E−04 | 9.3232E−03 | −5.3102E−04 |
| S18 | −2.1357E+00 | 3.8013E−01 | −1.4497E−01 | 2.3797E−02 | −1.8302E−02 | −2.3845E−03 |

| surface number | A16 | A18 | A20 | A22 | A24 | A26 |
|---|---|---|---|---|---|---|
| S1 | −9.5809E−06 | 0.0000E+00 | 0.0000E+00 | 0.0000E+00 | 0.0000E+00 | 0.0000E+00 |
| S2 | 2.7739E−05 | 0.0000E+00 | 0.0000E+00 | 0.0000E+00 | 0.0000E+00 | 0.0000E+00 |
| S3 | 3.0325E−05 | 0.0000E+00 | 0.0000E+00 | 0.0000E+00 | 0.0000E+00 | 0.0000E+00 |

TABLE 9-continued

| | | | | | | |
|---|---|---|---|---|---|---|
| S4 | −2.8085E−06 | 0.0000E+00 | 0.0000E+00 | 0.0000E+00 | 0.0000E+00 | 0.0000E+00 |
| S5 | −4.0704E−05 | 0.0000E+00 | 0.0000E+00 | 0.0000E+00 | 0.0000E+00 | 0.0000E+00 |
| S6 | −2.2522E−05 | 0.0000E+00 | 0.0000E+00 | 0.0000E+00 | 0.0000E+00 | 0.0000E+00 |
| S7 | −3.7824E−05 | 0.0000E+00 | 0.0000E+00 | 0.0000E+00 | 0.0000E+00 | 0.0000E+00 |
| S8 | 1.5020E−04 | 0.0000E+00 | 0.0000E+00 | 0.0000E+00 | 0.0000E+00 | 0.0000E+00 |
| S9 | 2.1072E−04 | 0.0000E+00 | 0.0000E+00 | 0.0000E+00 | 0.0000E+00 | 0.0000E+00 |
| S10 | 3.8196E−05 | 0.0000E+00 | 0.0000E+00 | 0.0000E+00 | 0.0000E+00 | 0.0000E+00 |
| S11 | −5.0817E−05 | 0.0000E+00 | 0.0000E+00 | 0.0000E+00 | 0.0000E+00 | 0.0000E+00 |
| S12 | −4.2623E−04 | −1.7104E−04 | 0.0000E+00 | 0.0000E+00 | 0.0000E+00 | 0.0000E+00 |
| S13 | −1.1067E−03 | −4.8605E−04 | 0.0000E+00 | 0.0000E+00 | 0.0000E+00 | 0.0000E+00 |
| S14 | −1.9853E−04 | 0.0000E+00 | 0.0000E+00 | 0.0000E+00 | 0.0000E+00 | 0.0000E+00 |
| S15 | −5.6074E−04 | −3.8859E−04 | 3.3478E−04 | 2.4272E−04 | −5.4071E−05 | −6.9392E−05 |
| S16 | −1.8546E−04 | −8.7690E−05 | 9.1960E−05 | 1.2158E−04 | 1.3978E−05 | −2.3652E−05 |
| S17 | 8.5329E−04 | −2.2983E−03 | 1.1705E−03 | −1.1617E−04 | −2.8060E−04 | −1.1780E−04 |
| S18 | 1.7306E−03 | 9.3261E−04 | 1.2748E−03 | 0.0000E+00 | 0.0000E+00 | 0.0000E+00 |

Figure 6A:
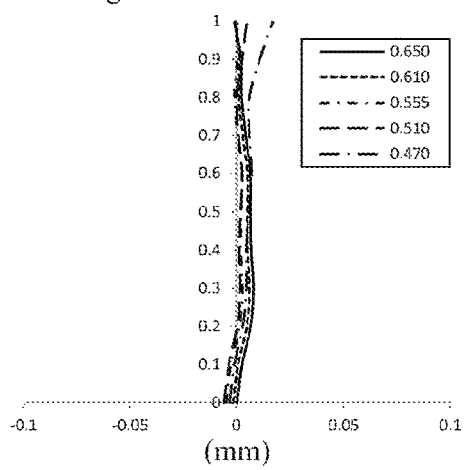
FIGS. 6a-6d respectively show a longitudinal aberration curve, an astigmatic curve, a distortion curve and a lateral color curve of Embodiment 3 of the optical imaging lens assembly according to the present disclosure.
Figure 6B:
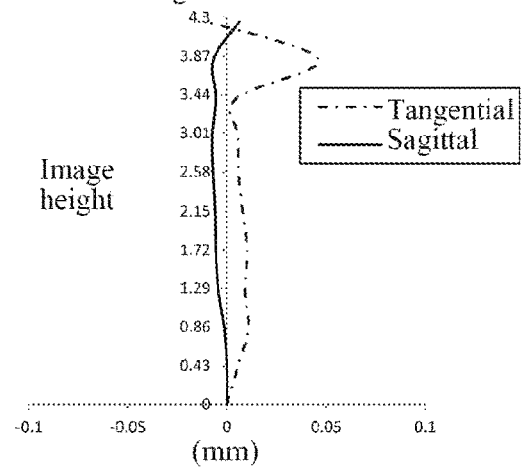
Figure 6C:
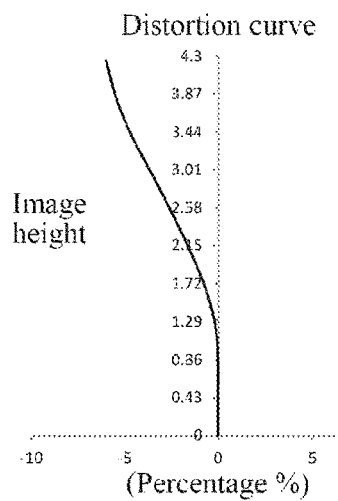
Figure 6D:
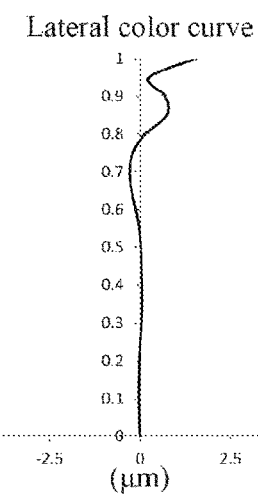

FIG. 6a illustrates a longitudinal aberration curve of the optical imaging lens assembly according to Embodiment 3, representing deviations of focal points at which lights of different wavelengths converge after passing through the lens assembly. FIG. 6b illustrates an astigmatic curve of the optical imaging lens assembly according to Embodiment 3, representing a curvature of a tangential image plane and a curvature of a sagittal image plane. FIG. 6c illustrates a distortion curve of the optical imaging lens assembly according to Embodiment 3, representing amounts of distortion corresponding to different image heights. FIG. 6d illustrates a lateral color curve of the optical imaging lens assembly according to Embodiment 3, representing deviations of different heights of images on the image plane formed by lights passing through the lens assembly. It can be seen from FIGS. 6a-6d that the optical imaging lens assembly given in Embodiment 3 can achieve a good imaging quality.

Embodiment 4

Figure 7:
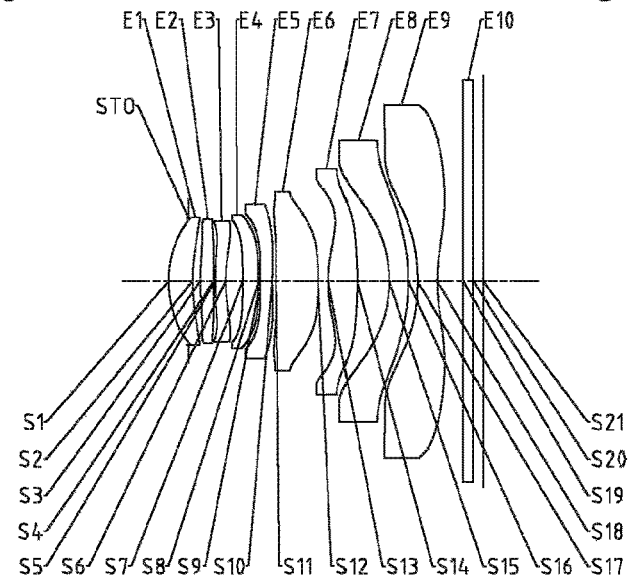
FIG. 7 is a schematic structural diagram of a lens group in Embodiment 4 of the optical imaging lens assembly according to the present disclosure.

FIG. 7 is a schematic structural diagram of a lens group in Embodiment 4 of the optical imaging lens assembly according to the present disclosure. The optical imaging lens assembly includes, sequentially along an optical axis from an object side to an image side, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an image plane S21.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The ninth lens E9 has a negative refractive power, an object-side surface S17 of the ninth lens E9 is a concave surface, and an image-side surface S18 of the ninth lens E9 is a concave surface. The optical filter E10 has an object-side surface S19 and an image-side surface S20. Light from an object sequentially passes through the surfaces S1-S20 and finally forms an image on the image plane S21.

As shown in Table 10, Table 10 is a table showing basic parameters of the optical imaging lens assembly in Embodiment 4. Here, the units of a radius of curvature, a thickness and a focal length are millimeters (mm).

TABLE 10

| surface number | surface type | radius of curvature | thickness/ distance | focal length | refractive index | abbe number | conic coefficient |
|---|---|---|---|---|---|---|---|
| OBJ | spherical | infinite | infinite | | | | |
| STO | spherical | infinite | −0.4064 | | | | |
| S1 | aspheric | 2.2811 | 0.4939 | 10.12 | 1.55 | 56.1 | 0.1597 |
| S2 | aspheric | 3.5882 | 0.1646 | | | | −0.0372 |
| S3 | aspheric | 5.4296 | 0.2788 | 10.08 | 1.55 | 56.1 | −4.4334 |
| S4 | aspheric | 400.0000 | 0.0284 | | | | −99.0000 |
| S5 | aspheric | 4.8948 | 0.2200 | −12.48 | 1.67 | 20.4 | −5.2703 |
| S6 | aspheric | 3.0264 | 0.3525 | | | | −1.3571 |
| S7 | aspheric | −14.1346 | 0.3303 | 31.16 | 1.55 | 56.1 | 61.9462 |
| S8 | aspheric | −7.7837 | 0.0350 | | | | 1.7375 |
| S9 | aspheric | 71.6321 | 0.2500 | −17.01 | 1.67 | 20.4 | −99.0000 |
| S10 | aspheric | 9.7713 | 0.0850 | | | | −67.3783 |
| S11 | aspheric | −501.6445 | 0.8617 | 36.96 | 1.57 | 38.0 | 99.0000 |
| S12 | aspheric | −20.2435 | 0.2129 | | | | 69.8017 |
| S13 | aspheric | 2.6606 | 0.5930 | 3.62 | 1.54 | 55.9 | −6.8557 |

TABLE 10-continued

| surface number | surface type | radius of curvature | thickness/ distance | focal length | refractive index | abbe number | conic coefficient |
|---|---|---|---|---|---|---|---|
| S14 | aspheric | −6.6228 | 0.6606 | | | | −5.9411 |
| S15 | aspheric | −3.0220 | 0.4000 | −16.48 | 1.64 | 23.8 | −0.6981 |
| S16 | aspheric | −4.4537 | 0.1885 | | | | −2.3912 |
| S17 | aspheric | −4.5133 | 0.4073 | −3.51 | 1.54 | 55.9 | −1.0282 |
| S18 | aspheric | 3.3394 | 0.5450 | | | | −2.0862 |
| S19 | spherical | infinite | 0.2100 | | 1.52 | 64.2 | |
| S20 | spherical | infinite | 0.1995 | | | | |
| S21 | spherical | infinite | | | | | |

As shown in Table 11, in Embodiment 4, the total effective focal length of the optical imaging lens assembly is f=4.83 mm, and the axial distance from the object-side surface S1 of first lens E1 to the image plane S21 is TTL=6.52 mm. The half of the diagonal length of the effective pixel area on the image plane S21 is ImgH=4.25 mm. The half of the maximal field-of-view of an optical imaging system is Semi-FOV=43.1°. The parameter in each relational expression is as explained in Embodiment 1, and the value of the each relational expression is listed in the following table.

TABLE 11

| Embodiment 4 | | | |
|---|---|---|---|
| f(mm) | 4.83 | TTL(mm) | 6.52 |
| ImgH(mm) | 4.25 | Semi-FOV(°) | 43.1 |

TABLE 11-continued

| Embodiment 4 | | | |
|---|---|---|---|
| f/EPD | 1.88 | f2/f1 | 1.00 |
| f5/f3 + f9/f8 | 1.58 | (R8 − R7)/f4 | 0.20 |
| R13/f7 | 0.74 | f56/f789 | −1.34 |
| ImgH/(DT81 + DT82) | 0.80 | SAG41/SAG51 | 0.72 |
| SAG62/SAG91 | 0.85 | CT8/SAG82 | −0.61 |
| R3/(R1 + R2) | 0.93 | (R5 + R6)/R10 | 0.81 |
| R11/(R11 + R12) | 0.96 | R15/R16 + R17/R14 | 1.36 |
| (T34 + T45 + T56)/CT6 | 0.55 | CT9/CT7 + T89/T78 | 0.97 |

In Embodiment 4, the object-side surface and the image-side surface of each lens in the first to ninth lenses E1-E9 are both aspheric surfaces. Table 12 shows the high-order coefficients $A_4, A_6, A_8, A_{10}, A_{12}, A_{14}, A_{16}, A_{18}, A_{20}, A_{22}, A_{24}$ and $A_{26}$ applicable to the aspheric surfaces S1-S18 in Embodiment 4.

TABLE 12

| surface number | A4 | A6 | A8 | A10 | A12 | A14 |
|---|---|---|---|---|---|---|
| S1 | 1.4432E−02 | 4.4398E−03 | 5.2264E−04 | −4.2257E−05 | −6.0072E−05 | −2.1833E−05 |
| S2 | −8.5732E−02 | 4.1596E−03 | 2.0259E−03 | 1.7300E−04 | 2.3429E−04 | 1.1892E−04 |
| S3 | −1.0964E−01 | 1.6836E−02 | 5.8221E−03 | 4.3273E−04 | 7.7392E−04 | 3.1228E−04 |
| S4 | −3.5809E−02 | 6.0541E−03 | 1.7336E−03 | −3.0939E−04 | 6.7098E−04 | 7.8180E−05 |
| S5 | −1.4873E−01 | −6.9588E−03 | −2.0433E−03 | −1.2021E−04 | 2.0419E−04 | −1.0850E−04 |
| S6 | −1.5817E−01 | −1.6336E−03 | −2.4866E−04 | 4.4860E−04 | 1.3418E−05 | −4.5202E−05 |
| S7 | −1.1992E−01 | −1.9751E−02 | 1.7313E−03 | −9.3901E−05 | −2.9761E−04 | −1.4127E−04 |
| S8 | −1.9637E−01 | −1.2124E−02 | 3.8922E−03 | −3.0976E−03 | −5.4519E−04 | 2.0733E−04 |
| S9 | −2.9467E−01 | 5.8253E−03 | −4.1041E−03 | −2.4971E−03 | 3.3694E−04 | 5.2101E−04 |
| S10 | −2.6432E−01 | 2.7279E−02 | −9.3448E−03 | −1.0360E−03 | 9.8350E−04 | 7.5732E−05 |
| S11 | −6.4766E−02 | 4.2330E−02 | −2.8147E−03 | −1.5161E−03 | 1.1374E−03 | −3.4443E−04 |
| S12 | −6.0959E−01 | 1.1931E−01 | 8.7104E−03 | 7.2340E−03 | 3.8436E−04 | −7.7682E−04 |
| S13 | −7.9558E−01 | −8.6656E−04 | 2.6733E−02 | 6.0400E−03 | 4.0330E−03 | 1.3352E−04 |
| S14 | −1.0004E−01 | 7.4825E−03 | 5.3835E−02 | −2.1692E−02 | 2.7923E−03 | 1.5062E−03 |
| S15 | −1.4658E−01 | 1.5747E−01 | −9.9062E−03 | −3.2345E−03 | −3.4309E−03 | 3.3665E−03 |
| S16 | 1.2059E−01 | 8.6219E−02 | −9.1929E−03 | −5.5675E−03 | −3.9542E−03 | 4.0211E−03 |
| S17 | 2.6706E−01 | 2.3121E−01 | −1.0509E−01 | 4.1417E−03 | 6.9226E−03 | −1.2783E−03 |
| S18 | −2.1774E+00 | 4.1463E−01 | −1.5426E−01 | 3.0572E−02 | −2.0767E−02 | −1.3753E−03 |

| surface number | A16 | A18 | A20 | A22 | A24 | A26 |
|---|---|---|---|---|---|---|
| S1 | −8.6585E−06 | 0.0000E+00 | 0.0000E+00 | 0.0000E+00 | 0.0000E+00 | 0.0000E+00 |
| S2 | 3.1178E−05 | 0.0000E+00 | 0.0000E+00 | 0.0000E+00 | 0.0000E+00 | 0.0000E+00 |
| S3 | 3.0891E−05 | 0.0000E+00 | 0.0000E+00 | 0.0000E+00 | 0.0000E+00 | 0.0000E+00 |
| S4 | 3.8568E−06 | 0.0000E+00 | 0.0000E+00 | 0.0000E+00 | 0.0000E+00 | 0.0000E+00 |
| S5 | −3.6363E−05 | 0.0000E+00 | 0.0000E+00 | 0.0000E+00 | 0.0000E+00 | 0.0000E+00 |
| S6 | −2.3427E−05 | 0.0000E+00 | 0.0000E+00 | 0.0000E+00 | 0.0000E+00 | 0.0000E+00 |
| S7 | −4.2683E−05 | 0.0000E+00 | 0.0000E+00 | 0.0000E+00 | 0.0000E+00 | 0.0000E+00 |
| S8 | 1.2617E−04 | 0.0000E+00 | 0.0000E+00 | 0.0000E+00 | 0.0000E+00 | 0.0000E+00 |
| S9 | 1.8483E−04 | 0.0000E+00 | 0.0000E+00 | 0.0000E+00 | 0.0000E+00 | 0.0000E+00 |
| S10 | 2.4545E−05 | 0.0000E+00 | 0.0000E+00 | 0.0000E+00 | 0.0000E+00 | 0.0000E+00 |
| S11 | −5.4005E−05 | 0.0000E+00 | 0.0000E+00 | 0.0000E+00 | 0.0000E+00 | 0.0000E+00 |
| S12 | −3.9601E−04 | −1.5492E−04 | 0.0000E+00 | 0.0000E+00 | 0.0000E+00 | 0.0000E+00 |
| S13 | −9.7576E−04 | −4.2899E−04 | 0.0000E+00 | 0.0000E+00 | 0.0000E+00 | 0.0000E+00 |
| S14 | −1.7433E−04 | 0.0000E+00 | 0.0000E+00 | 0.0000E+00 | 0.0000E+00 | 0.0000E+00 |
| S15 | −4.9790E−04 | −1.7579E−04 | 3.3970E−04 | 2.3384E−04 | −1.3034E−05 | −4.6630E−05 |
| S16 | −1.2367E−03 | −6.5794E−04 | −2.0178E−05 | 6.8516E−05 | 2.3442E−05 | −1.2643E−05 |

TABLE 12-continued

| | | | | | | |
|---|---|---|---|---|---|---|
| S17 | 2.1142E−03 | −2.7738E−03 | 1.2606E−03 | −6.8240E−05 | −2.5088E−04 | −1.1050E−04 |
| S18 | 9.4915E−04 | 8.3309E−04 | 1.0208E−03 | 0.0000E+00 | 0.0000E+00 | 0.0000E+00 |

Figure 8A:
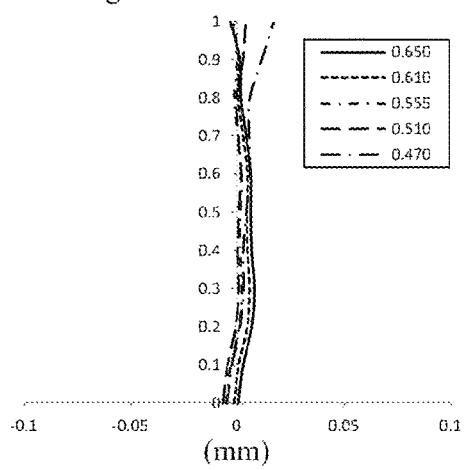
FIGS. 8a-8d respectively show a longitudinal aberration curve, an astigmatic curve, a distortion curve and a lateral color curve of Embodiment 4 of the optical imaging lens assembly according to the present disclosure.
Figure 8B:
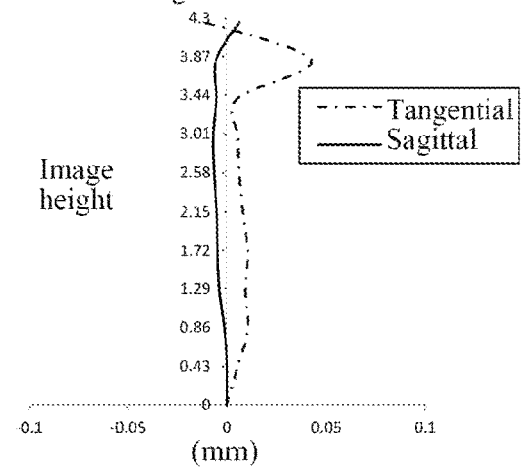
Figure 8C:
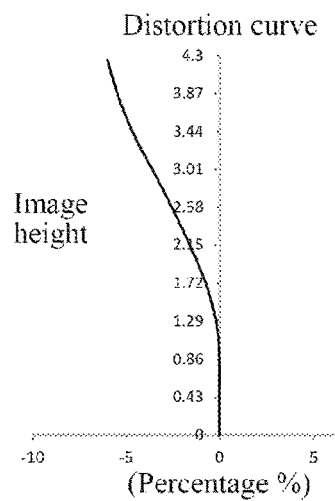
Figure 8D:
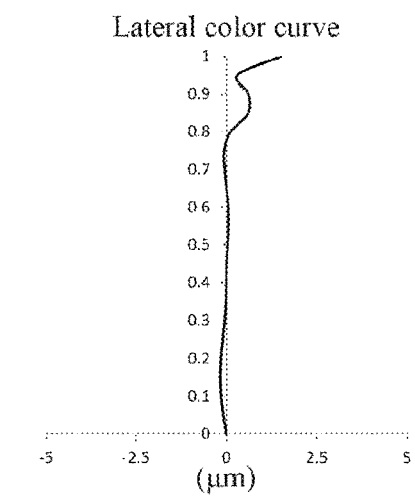

FIG. 8a illustrates a longitudinal aberration curve of the optical imaging lens assembly according to Embodiment 4, representing deviations of focal points at which lights of different wavelengths converge after passing through the lens assembly. FIG. 8b illustrates an astigmatic curve of the optical imaging lens assembly according to Embodiment 4, representing a curvature of a tangential image plane and a curvature of a sagittal image plane. FIG. 8c illustrates a distortion curve of the optical imaging lens assembly according to Embodiment 4, representing amounts of distortion corresponding to different image heights. FIG. 8d illustrates a lateral color curve of the optical imaging lens assembly according to Embodiment 4, representing deviations of different heights of images on the image plane formed by lights passing through the lens assembly. It can be seen from FIGS. 8a-8d that the optical imaging lens assembly given in Embodiment 4 can achieve a good imaging quality.

Embodiment 5

Figure 9:
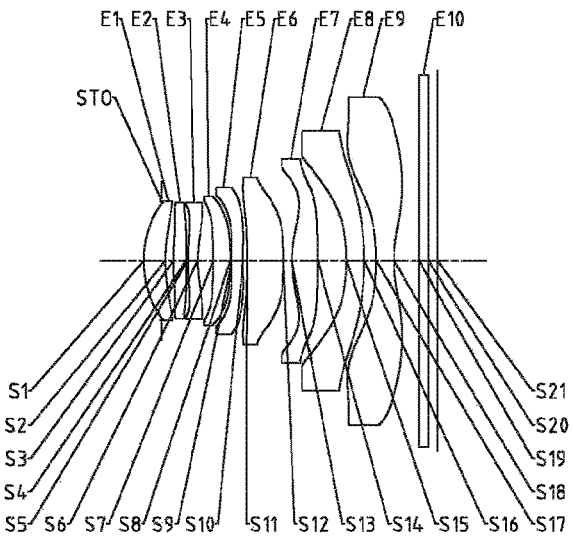
FIG. 9 is a schematic structural diagram of a lens group in Embodiment 5 of the optical imaging lens assembly according to the present disclosure.

FIG. 9 is a schematic structural diagram of a lens group in Embodiment 5 of the optical imaging lens assembly according to the present disclosure. The optical imaging lens assembly includes, sequentially along an optical axis from an object side to an image side, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an image plane S21.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The ninth lens E9 has a negative refractive power, an object-side surface S17 of the ninth lens E9 is a concave surface, and an image-side surface S18 of the ninth lens E9 is a concave surface. The optical filter E10 has an object-side surface S19 and an image-side surface S20. Light from an object sequentially passes through the surfaces S1-S20 and finally forms an image on the image plane S21.

As shown in Table 13, Table 13 is a table showing basic parameters of the optical imaging lens assembly in Embodiment 5. Here, the units of a radius of curvature, a thickness and a focal length are millimeters (mm).

TABLE 13

| surface number | surface type | radius of curvature | thickness/ distance | focal length | refractive index | abbe number | conic coefficient |
|---|---|---|---|---|---|---|---|
| OBJ | spherical | infinite | infinite | | | | |
| STO | spherical | infinite | −0.4024 | | | | |
| S1 | aspheric | 2.3741 | 0.4869 | 11.15 | 1.55 | 56.1 | 0.1792 |
| S2 | aspheric | 3.6111 | 0.1820 | | | | 0.1381 |
| S3 | aspheric | 5.3739 | 0.2830 | 9.83 | 1.55 | 56.1 | −9.0186 |
| S4 | aspheric | −3000.0000 | 0.0350 | | | | 99.0000 |
| S5 | aspheric | 4.6998 | 0.2200 | −11.76 | 1.67 | 20.4 | −7.2001 |
| S6 | aspheric | 2.8833 | 0.3476 | | | | −1.3246 |
| S7 | aspheric | −17.0013 | 0.3846 | 20.70 | 1.55 | 56.1 | −76.6471 |
| S8 | aspheric | −6.8432 | 0.0350 | | | | −5.9486 |
| S9 | aspheric | 80.9735 | 0.2500 | −17.79 | 1.67 | 20.4 | 99.0000 |
| S10 | aspheric | 10.3312 | 0.0883 | | | | −99.0000 |
| S11 | aspheric | −49.7265 | 0.8148 | 75.76 | 1.57 | 38.0 | 99.0000 |
| S12 | aspheric | −23.2589 | 0.1925 | | | | 99.0000 |
| S13 | aspheric | 2.4919 | 0.5656 | 3.82 | 1.54 | 55.9 | −6.9499 |
| S14 | aspheric | −10.6626 | 0.6399 | | | | 5.2673 |
| S15 | aspheric | −4.5287 | 0.4000 | −45.25 | 1.64 | 23.8 | 0.6096 |
| S16 | aspheric | −5.5529 | 0.2650 | | | | −4.6501 |
| S17 | aspheric | −5.1622 | 0.3955 | −3.26 | 1.54 | 55.9 | −0.9345 |
| S18 | aspheric | 2.7236 | 0.5666 | | | | −2.8375 |
| S19 | spherical | infinite | 0.2100 | | 1.52 | 64.2 | |
| S20 | spherical | infinite | 0.2033 | | | | |
| S21 | spherical | infinite | | | | | |

As shown in Table 14, in Embodiment 5, the total effective focal length of the optical imaging lens assembly is f=4.83 mm, and the axial distance from the object-side surface S1 of first lens E1 to the image plane S21 is TTL=6.57 mm. The half of the diagonal length of the effective pixel area on the image plane S21 is ImgH=4.25 mm. The half of the maximal field-of-view of an optical imaging system is Semi-FOV=43.1°. The parameter in each relational expression is as explained in Embodiment 1, and the value of the each relational expression is listed in the following table.

TABLE 14

Embodiment 5

| | | | |
|---|---|---|---|
| f(mm) | 4.83 | TTL(mm) | 6.57 |
| ImgH(mm) | 4.25 | Semi-FOV(°) | 43.1 |
| f/EPD | 1.85 | f2/f1 | 0.88 |
| f5/f3 + f9/f8 | 1.58 | (R8 − R7)/f4 | 0.49 |
| R13/f7 | 0.65 | f56/f789 | −1.18 |
| ImgH/(DT81 + DT82) | 0.82 | SAG41/SAG51 | 0.57 |
| SAG62/SAG91 | 0.94 | CT8/SAG82 | −0.71 |
| R3/(R1 + R2) | 0.90 | (R5 + R6)/R10 | 0.73 |
| R11/(R11 + R12) | 0.68 | R15/R16 + R17/R14 | 1.30 |
| (T34 + T45 + T56)/CT6 | 0.58 | CT9/CT7 + T89/T78 | 1.11 |

In Embodiment 5, the object-side surface and the image-side surface of each lens in the first to ninth lenses E1-E9 are both aspheric surfaces. Table 15 shows the high-order coefficients $A_4, A_6, A_8, A_{10}, A_{12}, A_{14}, A_{16}, A_{18}, A_{20}, A_{22}, A_{24}$ and $A_{26}$ applicable to the aspheric surfaces S1-S18 in Embodiment 5.

TABLE 15

| surface number | A4 | A6 | A8 | A10 | A12 | A14 |
|---|---|---|---|---|---|---|
| S1 | 1.7549E−02 | 5.9471E−03 | 9.1146E−04 | 3.9734E−05 | −3.7584E−05 | −1.9363E−05 |
| S2 | −8.5577E−02 | 4.2372E−03 | 1.8731E−03 | 9.7720E−05 | 2.3027E−04 | 1.2078E−04 |
| S3 | −1.1845E−01 | 1.4287E−02 | 5.9413E−03 | 1.5221E−04 | 7.6409E−04 | 3.3565E−04 |
| S4 | −5.0378E−02 | 5.4155E−03 | 1.9968E−03 | −5.2858E−04 | 7.4310E−04 | 9.5236E−05 |
| S5 | −1.6790E−01 | −7.3528E−03 | −2.7755E−03 | −2.1254E−04 | 2.1734E−04 | −1.3429E−04 |
| S6 | −1.8536E−01 | 4.2762E−03 | 1.3046E−03 | 1.0343E−03 | −2.9675E−05 | −1.3039E−04 |
| S7 | −1.3046E−01 | −1.1532E−02 | 6.0394E−03 | 4.2649E−04 | −5.6129E−04 | −3.3460E−04 |
| S8 | −2.2097E−01 | −8.1936E−03 | 5.3503E−03 | −3.7496E−03 | −8.1613E−04 | 2.0855E−04 |
| S9 | −3.3292E−01 | 6.5112E−03 | −6.9794E−03 | −2.6012E−03 | 4.0387E−04 | 7.0154E−04 |
| S10 | −3.3459E−01 | 2.3082E−02 | −1.6406E−02 | −1.5739E−03 | 6.5846E−04 | −2.7458E−05 |
| S11 | −8.6407E−02 | 4.3026E−02 | −4.3155E−03 | −1.5947E−03 | 1.2009E−03 | −4.6637E−04 |
| S12 | −6.2487E−01 | 1.2088E−01 | 6.8964E−03 | 8.1402E−03 | 7.9089E−04 | −4.0522E−04 |
| S13 | −7.7895E−01 | −8.4189E−03 | 3.1088E−02 | 6.9357E−03 | 3.3791E−03 | 7.8004E−06 |
| S14 | −1.5660E−01 | 1.0396E−03 | 5.1560E−02 | −1.9185E−02 | 1.3967E−03 | 1.1651E−03 |
| S15 | −3.8856E−01 | 1.1558E−01 | −9.6403E−03 | −3.2377E−03 | −3.6208E−04 | 1.2863E−03 |
| S16 | 2.1833E−02 | 3.1923E−02 | 1.1387E−02 | −1.1414E−02 | 3.8585E−03 | −1.6194E−03 |
| S17 | 2.3468E−01 | 2.5308E−01 | −1.1714E−01 | 8.3675E−03 | 1.0525E−02 | −6.4278E−03 |
| S18 | −2.2497E+00 | 4.9808E−01 | −1.8096E−01 | 4.4224E−02 | −2.6290E−02 | 2.4558E−03 |

| surface number | A16 | A18 | A20 | A22 | A24 | A26 |
|---|---|---|---|---|---|---|
| S1 | −8.0274E−06 | 0.0000E+00 | 0.0000E+00 | 0.0000E+00 | 0.0000E+00 | 0.0000E+00 |
| S2 | 3.6195E−05 | 0.0000E+00 | 0.0000E+00 | 0.0000E+00 | 0.0000E+00 | 0.0000E+00 |
| S3 | 3.9599E−05 | 0.0000E+00 | 0.0000E+00 | 0.0000E+00 | 0.0000E+00 | 0.0000E+00 |
| S4 | 1.7726E−05 | 0.0000E+00 | 0.0000E+00 | 0.0000E+00 | 0.0000E+00 | 0.0000E+00 |
| S5 | −3.5028E−05 | 0.0000E+00 | 0.0000E+00 | 0.0000E+00 | 0.0000E+00 | 0.0000E+00 |
| S6 | −4.7301E−05 | 0.0000E+00 | 0.0000E+00 | 0.0000E+00 | 0.0000E+00 | 0.0000E+00 |
| S7 | −8.8182E−05 | 0.0000E+00 | 0.0000E+00 | 0.0000E+00 | 0.0000E+00 | 0.0000E+00 |
| S8 | 1.0238E−04 | 0.0000E+00 | 0.0000E+00 | 0.0000E+00 | 0.0000E+00 | 0.0000E+00 |
| S9 | 1.7247E−04 | 0.0000E+00 | 0.0000E+00 | 0.0000E+00 | 0.0000E+00 | 0.0000E+00 |
| S10 | −4.1938E−05 | 0.0000E+00 | 0.0000E+00 | 0.0000E+00 | 0.0000E+00 | 0.0000E+00 |
| S11 | −7.0518E−05 | 0.0000E+00 | 0.0000E+00 | 0.0000E+00 | 0.0000E+00 | 0.0000E+00 |
| S12 | −2.4928E−04 | −1.2231E−04 | 0.0000E+00 | 0.0000E+00 | 0.0000E+00 | 0.0000E+00 |
| S13 | −8.4864E−04 | −3.9999E−04 | 0.0000E+00 | 0.0000E+00 | 0.0000E+00 | 0.0000E+00 |
| S14 | −1.2312E−04 | 0.0000E+00 | 0.0000E+00 | 0.0000E+00 | 0.0000E+00 | 0.0000E+00 |
| S15 | −4.4731E−04 | −2.2216E−04 | 1.0214E−04 | 1.5222E−04 | 1.1243E−04 | 2.5610E−05 |
| S16 | 9.1793E−04 | −6.7836E−05 | −2.8206E−05 | −1.0710E−05 | 8.2084E−06 | −1.1133E−06 |
| S17 | 4.0959E−03 | −2.7466E−03 | 1.0712E−03 | 5.3397E−05 | −1.6536E−04 | −8.8243E−05 |
| S18 | −1.4827E−04 | 1.1796E−03 | 9.2346E−05 | 0.0000E+00 | 0.0000E+00 | 0.0000E+00 |

Figure 10A:
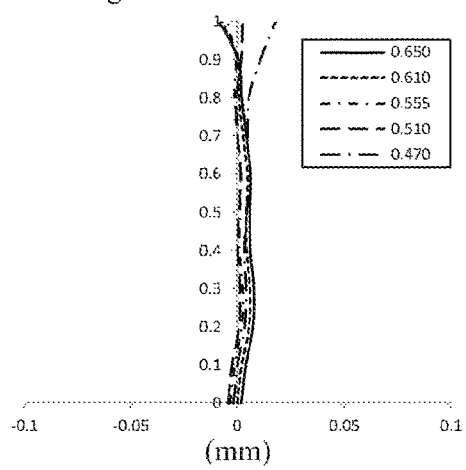
FIGS. 10a-10d respectively show a longitudinal aberration curve, an astigmatic curve, a distortion curve and a lateral color curve of Embodiment 5 of the optical imaging lens assembly according to the present disclosure.
Figure 10B:
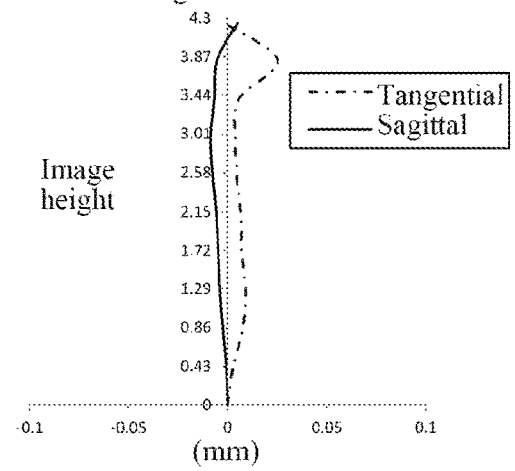
Figures 10C, 10D:
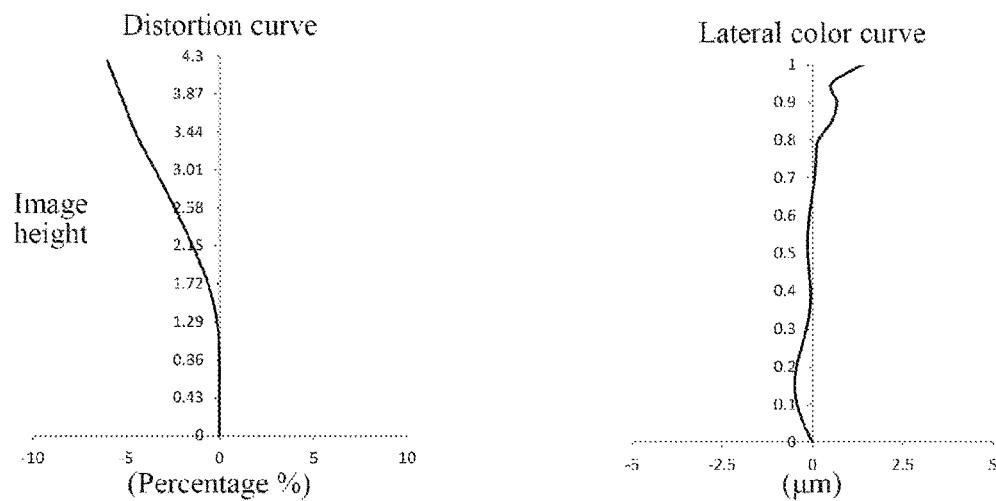

FIG. 10a illustrates a longitudinal aberration curve of the optical imaging lens assembly according to Embodiment 5, representing deviations of focal points at which lights of different wavelengths converge after passing through the lens assembly. FIG. 10b illustrates an astigmatic curve of the optical imaging lens assembly according to Embodiment 5, representing a curvature of a tangential image plane and a curvature of a sagittal image plane. FIG. 10c illustrates a distortion curve of the optical imaging lens assembly according to Embodiment 5, representing amounts of distortion corresponding to different image heights. FIG. 10d illustrates a lateral color curve of the optical imaging lens assembly according to Embodiment 5, representing deviations of different heights of images on the image plane formed by lights passing through the lens assembly. It can be seen from FIGS. 10a-10d that the optical imaging lens assembly given in Embodiment 5 can achieve a good imaging quality.

Embodiment 6

Figure 11:
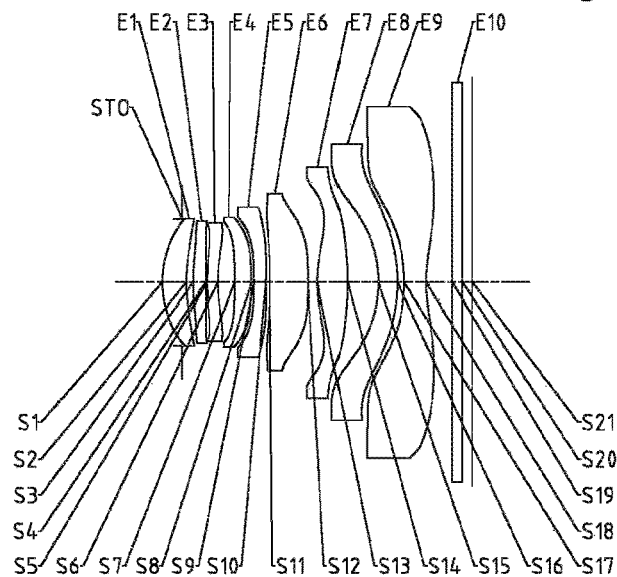
FIG. 11 is a schematic structural diagram of a lens group in Embodiment 6 of the optical imaging lens assembly according to the present disclosure.

FIG. 11 is a schematic structural diagram of a lens group in Embodiment 6 of the optical imaging lens assembly according to the present disclosure. The optical imaging lens assembly includes, sequentially along an optical axis from an object side to an image side, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an image plane S21.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a concave surface, and an image-side surface S16 of the eighth lens E8 is a convex surface. The ninth lens E9 has a negative refractive power, an object-side surface S17 of the ninth lens E9 is a concave surface, and an image-side surface S18 of the ninth lens E9 is a concave surface. The optical filter E10 has an object-side surface S19 and an image-side surface S20. Light from an object sequentially passes through the surfaces S1-S20 and finally forms an image on the image plane S21.

As shown in Table 16, Table 16 is a table showing basic parameters of the optical imaging lens assembly in Embodiment 6. Here, the units of a radius of curvature, a thickness and a focal length are millimeters (mm).

As shown in Table 17, in Embodiment 6, the total effective focal length of the optical imaging lens assembly is f=4.84 mm, and the axial distance from the object-side surface S1 of first lens E1 to the image plane S21 is TTL=6.47 mm. The half of the diagonal length of the effective pixel area on the image plane S21 is ImgH=4.25 mm. The half of the maximal field-of-view of an optical imaging system is Semi-FOV=43.1°. The parameter in each relational expression is as explained in Embodiment 1, and the value of the each relational expression is listed in the following table.

TABLE 17

| Embodiment 6 | | | |
|---|---|---|---|
| f(mm) | 4.84 | TTL(mm) | 6.47 |
| ImgH(mm) | 4.25 | Semi-FOV(°) | 43.1 |
| f/EPD | 1.88 | f2/f1 | 1.08 |
| f5/f3 + f9/f8 | 0.95 | (R8 − R7)/f4 | 0.50 |
| R13/f7 | 0.84 | f56/f789 | −0.77 |
| ImgH/(DT81 + DT82) | 0.79 | SAG41/SAG51 | 0.63 |
| SAG62/SAG91 | 0.69 | CT8/SAG82 | −0.54 |
| R3/(R1 + R2) | 0.82 | (R5 + R6)/R10 | 0.36 |
| R11/(R11 + R12) | 0.44 | R15/R16 + R17/R14 | 1.56 |
| (T34 + T45 + T56)/CT6 | 0.61 | CT9/CT7 + T89/T78 | 0.95 |

In Embodiment 6, the object-side surface and the image-side surface of each lens in the first to ninth lenses E1-E9 are both aspheric surfaces. Table 18 shows the high-order coefficients $A_4, A_6, A_8, A_{10}, A_{12}, A_{14}, A_{16}, A_{18}, A_{20}, A_{22}, A_{24}$ and $A_{26}$ applicable to the aspheric surfaces S1-S18 in Embodiment 6.

TABLE 16

| surface number | surface type | radius of curvature | thickness/ distance | focal length | refractive index | abbe number | conic coefficient |
|---|---|---|---|---|---|---|---|
| OBJ | spherical | infinite | infinite | | | | |
| STO | spherical | infinite | −0.4177 | | | | |
| S1 | aspheric | 2.2204 | 0.5004 | 10.15 | 1.55 | 56.1 | 0.1335 |
| S2 | aspheric | 3.4106 | 0.1454 | | | | −0.2958 |
| S3 | aspheric | 4.6122 | 0.2624 | 10.96 | 1.55 | 56.1 | −3.0883 |
| S4 | aspheric | 19.7373 | 0.0312 | | | | −97.2741 |
| S5 | aspheric | 4.3412 | 0.2200 | −16.53 | 1.67 | 20.4 | −3.7161 |
| S6 | aspheric | 3.0507 | 0.3520 | | | | −1.2083 |
| S7 | aspheric | −14.4492 | 0.3558 | 17.26 | 1.55 | 56.1 | 97.3963 |
| S8 | aspheric | −5.7529 | 0.0499 | | | | 3.2566 |
| S9 | aspheric | −14.7759 | 0.2500 | −12.91 | 1.67 | 20.4 | 22.6661 |
| S10 | aspheric | 20.7272 | 0.0810 | | | | −77.5658 |
| S11 | aspheric | −34.1764 | 0.7954 | −301.88 | 1.57 | 38.0 | −99.0000 |
| S12 | aspheric | −43.0000 | 0.1956 | | | | 99.0000 |
| S13 | aspheric | 2.8211 | 0.6271 | 3.37 | 1.54 | 55.9 | −5.7769 |
| S14 | aspheric | −4.6532 | 0.6418 | | | | −19.8746 |
| S15 | aspheric | −2.8247 | 0.4000 | −20.41 | 1.64 | 23.8 | −0.9259 |
| S16 | aspheric | −3.8029 | 0.1375 | | | | −1.4132 |
| S17 | aspheric | −3.8147 | 0.4621 | −3.36 | 1.54 | 55.9 | −1.0036 |
| S18 | aspheric | 3.5641 | 0.5542 | | | | −1.8818 |
| S19 | spherical | infinite | 0.2100 | | 1.52 | 64.2 | |
| S20 | spherical | infinite | 0.2030 | | | | |
| S21 | spherical | infinite | | | | | |

TABLE 18

| surface number | A4 | A6 | A8 | A10 | A12 | A14 |
|---|---|---|---|---|---|---|
| S1 | 1.2656E−02 | 4.5697E−03 | 8.1729E−04 | 1.4101E−04 | 1.6664E−05 | 8.7912E−06 |
| S2 | −8.5956E−02 | 3.1492E−03 | 2.3243E−03 | 1.8707E−04 | 1.7936E−04 | 1.0968E−04 |
| S3 | −1.0179E−01 | 1.0144E−02 | 5.3147E−03 | 2.8419E−05 | 4.3576E−04 | 2.6391E−04 |
| S4 | −2.8307E−02 | 5.3705E−03 | 1.5514E−03 | −3.8232E−04 | 5.0176E−04 | 1.0954E−04 |
| S5 | −1.3503E−01 | −2.8598E−03 | −2.1767E−03 | −2.0561E−04 | 2.2018E−04 | −7.2281E−05 |
| S6 | −1.4602E−01 | −2.9449E−03 | −1.0113E−03 | 1.6761E−04 | 9.1914E−05 | −1.5434E−05 |
| S7 | −1.1322E−01 | −2.0345E−02 | 9.0341E−04 | 3.2490E−04 | 1.1422E−04 | 5.0948E−05 |
| S8 | −1.7411E−01 | −1.7148E−02 | 3.7021E−03 | −1.4047E−03 | −1.2286E−04 | 3.2139E−04 |
| S9 | −2.5357E−01 | 2.2608E−03 | −2.4876E−03 | −1.9374E−03 | 1.2366E−04 | 4.6619E−04 |
| S10 | −2.2195E−01 | 3.0404E−02 | −6.7893E−03 | −7.8582E−04 | 7.3651E−04 | 2.2769E−04 |
| S11 | −4.4516E−02 | 3.8675E−02 | −2.7817E−03 | −1.3807E−03 | 6.7989E−04 | −8.2717E−05 |
| S12 | −6.1942E−01 | 1.1688E−01 | 9.7562E−03 | 5.2141E−03 | 1.2871E−04 | −1.1406E−03 |
| S13 | −7.8467E−01 | −1.4144E−03 | 2.8077E−02 | 4.8764E−03 | 4.3931E−03 | −2.8002E−04 |
| S14 | −8.7142E−02 | 1.0230E−02 | 5.0164E−02 | −2.8319E−02 | 5.6189E−03 | 2.8211E−03 |
| S15 | −2.0530E−02 | 2.1964E−01 | −2.4736E−02 | −1.3438E−02 | −1.3542E−03 | 5.1391E−03 |
| S16 | 1.3688E−01 | 1.7232E−01 | −2.8933E−02 | −7.4420E−03 | −3.7762E−03 | 5.5679E−03 |
| S17 | 2.7525E−01 | 2.4524E−01 | −1.0011E−01 | −8.7571E−03 | 1.4541E−02 | −1.1023E−03 |
| S18 | −2.1002E+00 | 3.5915E−01 | −1.360IE−01 | 1.5661E−02 | −1.4050E−02 | −3.2170E−03 |

| surface number | A16 | A18 | A20 | A22 | A24 | A26 |
|---|---|---|---|---|---|---|
| S1 | −9.2156E−08 | 0.0000E+00 | 0.0000E+00 | 0.0000E+00 | 0.0000E+00 | 0.0000E+00 |
| S2 | 2.8442E−05 | 0.0000E+00 | 0.0000E+00 | 0.0000E+00 | 0.0000E+00 | 0.0000E+00 |
| S3 | 1.8904E−05 | 0.0000E+00 | 0.0000E+00 | 0.0000E+00 | 0.0000E+00 | 0.0000E+00 |
| S4 | −3.4784E−05 | 0.0000E+00 | 0.0000E+00 | 0.0000E+00 | 0.0000E+00 | 0.0000E+00 |
| S5 | −6.6456E−05 | 0.0000E+00 | 0.0000E+00 | 0.0000E+00 | 0.0000E+00 | 0.0000E+00 |
| S6 | −1.9558E−05 | 0.0000E+00 | 0.0000E+00 | 0.0000E+00 | 0.0000E+00 | 0.0000E+00 |
| S7 | 5.1350E−06 | 0.0000E+00 | 0.0000E+00 | 0.0000E+00 | 0.0000E+00 | 0.0000E+00 |
| S8 | 1.3778E−04 | 0.0000E+00 | 0.0000E+00 | 0.0000E+00 | 0.0000E+00 | 0.0000E+00 |
| S9 | 1.7172E−04 | 0.0000E+00 | 0.0000E+00 | 0.0000E+00 | 0.0000E+00 | 0.0000E+00 |
| S10 | 2.6822E−06 | 0.0000E+00 | 0.0000E+00 | 0.0000E+00 | 0.0000E+00 | 0.0000E+00 |
| S11 | −1.2701E−04 | 0.0000E+00 | 0.0000E+00 | 0.0000E+00 | 0.0000E+00 | 0.0000E+00 |
| S12 | −4.8525E−04 | −1.8263E−04 | 0.0000E+00 | 0.0000E+00 | 0.0000E+00 | 0.0000E+00 |
| S13 | −1.4668E−03 | −6.1689E−04 | 0.0000E+00 | 0.0000E+00 | 0.0000E+00 | 0.0000E+00 |
| S14 | −7.1105E−04 | 0.0000E+00 | 0.0000E+00 | 0.0000E+00 | 0.0000E+00 | 0.0000E+00 |
| S15 | −1.0147E−04 | −6.1122E−04 | 2.0943E−04 | 3.6669E−05 | −1.0401E−04 | −4.3222E−05 |
| S16 | −2.0597E−03 | −9.5172E−04 | 1.6774E−04 | 1.4285E−04 | 2.1437E−06 | −3.0913E−05 |
| S17 | −6.5634E−04 | −1.1397E−03 | 6.5773E−04 | −1.5864E−04 | −3.0578E−04 | −1.2384E−04 |
| S18 | 2.1680E−03 | 7.3517E−04 | 1.2785E−03 | 0.0000E+00 | 0.0000E+00 | 0.0000E+00 |

Figure 12A:
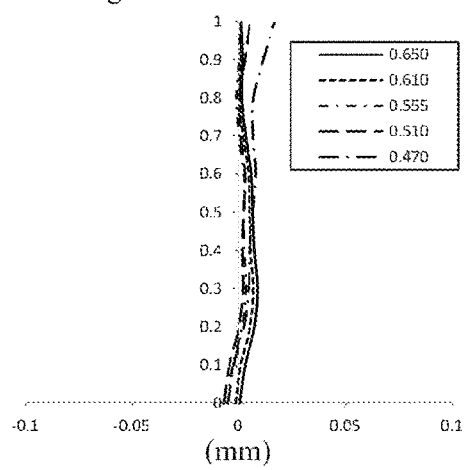
FIGS. 12a-12d respectively show a longitudinal aberration curve, an astigmatic curve, a distortion curve and a lateral color curve of Embodiment 6 of the optical imaging lens assembly according to the present disclosure.
Figure 12B:
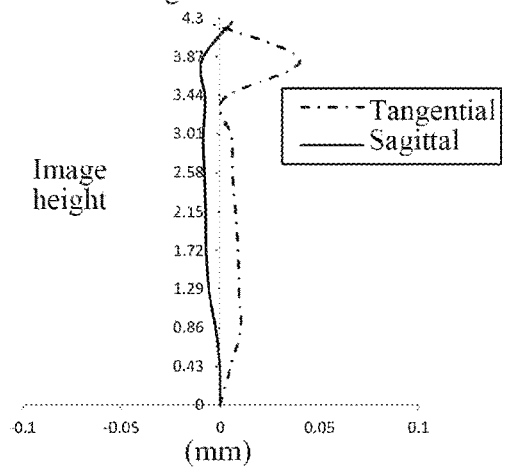
Figure 12C:
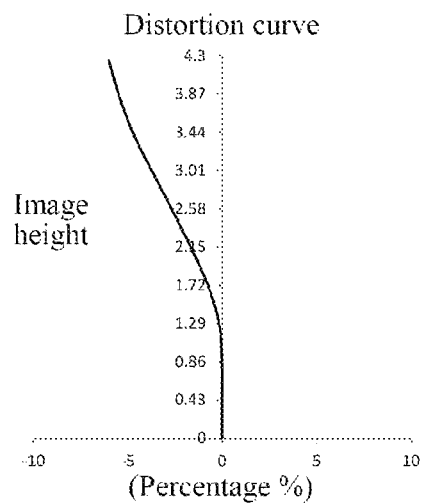
Figure 12D:
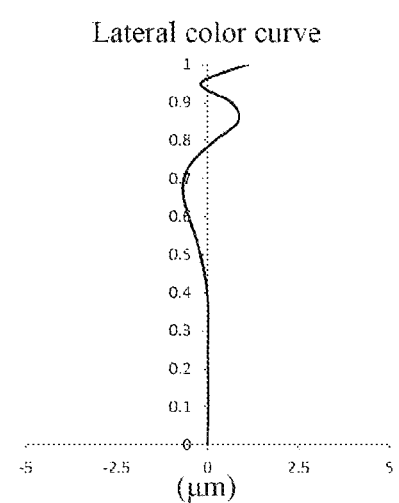

FIG. 12a illustrates a longitudinal aberration curve of the optical imaging lens assembly according to Embodiment 6, representing deviations of focal points at which lights of different wavelengths converge after passing through the lens assembly. FIG. 12b illustrates an astigmatic curve of the optical imaging lens assembly according to Embodiment 6, representing a curvature of a tangential image plane and a curvature of a sagittal image plane. FIG. 12c illustrates a distortion curve of the optical imaging lens assembly according to Embodiment 6, representing amounts of distortion corresponding to different image heights. FIG. 12d illustrates a lateral color curve of the optical imaging lens assembly according to Embodiment 6, representing deviations of different heights of images on the image plane formed by lights passing through the lens assembly. It can be seen from FIGS. 12a-12d that the optical imaging lens assembly given in Embodiment 6 can achieve a good imaging quality.

The foregoing embodiments are only preferred embodiments of the present disclosure, and are not intended to limit the present disclosure. Any modification, improvement, equivalent substitution, etc. made within the spirit and principle of the present disclosure shall fall within the scope of protection of the present disclosure.

What is claimed is:

1. An optical imaging lens assembly, comprising, sequentially along an optical axis from an object side to an image side:
   a first lens, having a positive refractive power;
   a second lens, having a positive refractive power;
   a third lens, having a negative refractive power;
   a fourth lens, having a positive refractive power;
   a fifth lens, having a negative refractive power;
   a sixth lens, having a refractive power;
   a seventh lens, having a positive refractive power;
   an eighth lens, having a negative refractive power, an object-side surface of the eighth lens being a concave surface; and
   a ninth lens, having a negative refractive power,
   wherein an axial distance SAG41 from an intersection point of the object-side surface of the fourth lens and the optical axis to a vertex of an effective radius of the object-side surface of the fourth lens and an axial distance SAG51 from an intersection point of an object-side surface of the fifth lens and the optical axis to a vertex of an effective radius of the object-side surface of the fifth lens satisfies: 0.5<SAG41/SAG51<1.

2. The optical imaging lens assembly according to claim 1, wherein an effective focal length f of the optical imaging lens assembly and an entrance pupil diameter EPD of the optical imaging lens assembly satisfy: f/EPD<1.9.

3. The optical imaging lens assembly according to claim 1, wherein an effective focal length f2 of the second lens and an effective focal length f1 of the first lens satisfy: 0.5<f2/f1<1.5.

4. The optical imaging lens assembly according to claim 1, wherein an effective focal length f5 of the fifth lens, an effective focal length f3 of the third lens, an effective focal length f9 of the ninth lens and an effective focal length f8 of the eighth lens satisfy: $0.6 < f5/f3+f9/f8 < 1.6$.

5. The optical imaging lens assembly according to claim 1, wherein a radius of curvature R8 of an image-side surface of the fourth lens, a radius of curvature R7 of an object-side surface of the fourth lens and an effective focal length f4 of the fourth lens satisfy: $0 < (R8-R7)/f4 < 1.0$.

6. The optical imaging lens assembly according to claim 1, wherein a radius of curvature R13 of an object-side surface of the seventh lens and an effective focal length f7 of the seventh lens satisfy: $0 < R13/f7 < 1.0$.

7. The optical imaging lens assembly according to claim 1, wherein a combined focal length f56 of the fifth lens and the sixth lens and a combined focal length f789 of the seventh lens, the eighth lens and the ninth lens satisfy: $-2.0 < f56/f789 < -0.5$.

8. The optical imaging lens assembly according to claim 1, wherein a half of a diagonal length ImgH of an effective pixel area on an image plane, a maximal effective radius DT81 of the object-side surface of the eighth lens and a maximal effective radius DT82 of an image-side surface of the eighth lens satisfy: $0.5 < ImgH/(DT81+DT82) < 1.0$.

9. The optical imaging lens assembly according to claim 1, an axial distance SAG62 from an intersection point of an image-side surface of the sixth lens and the optical axis to a vertex of an effective radius of the image-side surface of the sixth lens and an axial distance SAG91 from an intersection point of an object-side surface of the ninth lens and the optical axis to a vertex of an effective radius of the object-side surface of the ninth lens satisfy: $0.5 < SAG62/SAG91 < 1.0$.

10. The optical imaging lens assembly according to claim 1, wherein a center thickness CT8 of the eighth lens on the optical axis and an axial distance SAG82 from an intersection point of the image-side surface of the eighth lens and the optical axis to a vertex of an effective radius of the image-side surface of the eighth lens satisfy: $-1.0 < CT8/SAG82 < -0.5$.

11. The optical imaging lens assembly according to claim 1, wherein a radius of curvature R3 of an object-side surface of the second lens, a radius of curvature R1 of an object-side surface of the first lens and a radius of curvature R2 of an image-side surface of the first lens satisfy: $0 < R3/(R1+R2) < 1.0$.

12. The optical imaging lens assembly according to claim 1, wherein a radius of curvature R5 of an object-side surface of the third lens, a radius of curvature R6 of an image-side surface of the third lens, and a radius of curvature R10 of an image-side surface of the fifth lens satisfy: $0 < (R5+R6)/R10 < 1.0$.

13. The optical imaging lens assembly according to claim 1, wherein a radius of curvature R11 of an object-side surface of the sixth lens and a radius of curvature R12 of the image-side surface of the sixth lens satisfy: $0.3 < R11/(R11+R12) < 1.3$.

14. The optical imaging lens assembly according to claim 1, wherein a radius of curvature R15 of the object-side surface of the eighth lens, a radius of curvature R16 of the image-side surface of the eighth lens, a radius of curvature R17 of the object-side surface of the ninth lens and a radius of curvature R14 of an image-side surface of the seventh lens satisfy: $1.0 < R15/R16+R17/R14 < 2.0$.

15. The optical imaging lens assembly according to claim 1, wherein an axial air spacing T34 between the third lens and the fourth lens, an axial air spacing T45 between the fourth lens and the fifth lens, an axial spacing distance T56 between the fifth lens and the sixth lens and a center thickness CT6 of the sixth lens on the optical axis satisfy: $0.3 < (T34+T45+T56)/CT6 < 0.8$.

16. The optical imaging lens assembly according to claim 1, wherein a center thickness CT9 of the ninth lens on the optical axis, a center thickness CT7 of the seventh lens on the optical axis, an axial air spacing T89 between the eighth lens and the ninth lens and an axial spacing distance T78 between the seventh lens and the eighth lens satisfy: $0.7 < CT9/CT7+T89/T78 < 1.2$.

17. The optical imaging lens assembly according to claim 1, wherein
the object-side surface of the fourth lens is a concave surface, and the image-side surface of the fourth lens is a convex surface;
an image-side surface of the fifth lens is a concave surface;
the object-side surface of the seventh lens is a convex surface;
the image-side surface of the eighth lens is a convex surface; and
an object-side surface of the ninth lens is a concave surface.

18. The optical imaging lens assembly according to claim 1, wherein an image-side surface of the fifth lens is a concave surface.

19. The optical imaging lens assembly according to claim 18, wherein each lens is independent of each other, and each lens has an air gap on the optical axis; the effective focal length f of the optical imaging lens and the entrance pupil diameter EPD of the optical imaging lens satisfy: $f/EPD < 1.9$.

* * * * *